(12) United States Patent
Poupyrev et al.

(10) Patent No.: US 11,531,459 B2
(45) Date of Patent: Dec. 20, 2022

(54) CONTROL-ARTICLE-BASED CONTROL OF A USER INTERFACE

(71) Applicant: Google LLC, Mountain View, CA (US)

(72) Inventors: Ivan Poupyrev, Los Altos, CA (US); Carsten C. Schwesig, San Francisco, CA (US); Jack Schulze, Mountain View, CA (US); Timo Arnall, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/227,964

(22) Filed: Apr. 12, 2021

(65) Prior Publication Data

US 2021/0232303 A1 Jul. 29, 2021

Related U.S. Application Data

(63) Continuation of application No. 16/080,293, filed as application No. PCT/US2016/065295 on Dec. 7, 2016, now Pat. No. 11,003,345.
(Continued)

(51) Int. Cl.
G06F 3/04847 (2022.01)
G06F 3/01 (2006.01)
(Continued)

(52) U.S. Cl.
CPC .......... *G06F 3/04847* (2013.01); *G06F 3/011* (2013.01); *G06F 3/0487* (2013.01);
(Continued)

(58) Field of Classification Search
None
See application file for complete search history.

(56) References Cited

U.S. PATENT DOCUMENTS 5,670,987 A 9/1997 Koi et al.
6,037,893 A 3/2000 Lipman
(Continued)

FOREIGN PATENT DOCUMENTS

CN 102184020 9/2011
CN 102473032 5/2012
(Continued)

OTHER PUBLICATIONS

"EP Appeal Decision", European Application No. 10194359.5, dated May 28, 2019, 20 pages.
(Continued)

*Primary Examiner* — Ryan Barrett
(74) *Attorney, Agent, or Firm* — Colby Nipper PLLC

(57) ABSTRACT

Systems and methods of providing gesture-based control of a user interface are provided. For instance, a presence of a control article can be detected in a first proximity zone proximate a user device. Responsive to detecting the presence of the control article, presentation data corresponding to a presentation mode of a user interface associated with the user computing device can be provided for display. A presence of the control article can be detected in a second proximity zone proximate the user computing device. The second proximity zone can define a separate physical area than the first proximity zone. Responsive to detecting the presence of the control article in the second proximity zone, interactive data corresponding to an interactive mode of the user interface can be provided for display.

20 Claims, 8 Drawing Sheets

Related U.S. Application Data

(60) Provisional application No. 62/336,947, filed on May 16, 2016.

(51) Int. Cl.
*G06F 3/0487* (2013.01)
*G06F 1/16* (2006.01)
*G06F 3/0485* (2022.01)
*G06F 3/04886* (2022.01)
*G06F 3/0488* (2022.01)

(52) U.S. Cl.
CPC .............. *G06F 1/163* (2013.01); *G06F 3/017* (2013.01); *G06F 3/0485* (2013.01); *G06F 3/0488* (2013.01); *G06F 3/04886* (2013.01); *G06F 2203/04101* (2013.01)

(56) References Cited

U.S. PATENT DOCUMENTS

| | | |
|---|---|---|
| 6,215,890 B1 | 4/2001 | Matsuo et al. |
| 6,303,924 B1 | 10/2001 | Adan et al. |
| 6,380,882 B1 | 4/2002 | Hegnauer |
| 6,727,892 B1 | 4/2004 | Murphy |
| 6,970,128 B1 | 11/2005 | Dwelly et al. |
| 6,971,072 B1 | 11/2005 | Stein |
| 6,990,335 B1 | 1/2006 | Shamoon et al. |
| 7,999,722 B2 | 8/2011 | Beeri et al. |
| 8,237,666 B2 | 8/2012 | Soo et al. |
| 8,373,666 B2 | 2/2013 | Jung et al. |
| 8,508,347 B2 | 8/2013 | Pihlaja |
| 8,659,548 B2 | 2/2014 | Hildreth |
| 8,854,433 B1 | 10/2014 | Rafii |
| 9,075,429 B1 | 7/2015 | Karakotsios et al. |
| 9,134,798 B2 | 9/2015 | Morris et al. |
| 9,207,852 B1 | 12/2015 | Zhou et al. |
| 9,448,634 B1 | 9/2016 | Wakeford et al. |
| 9,575,560 B2 | 2/2017 | Poupyrev et al. |
| 9,629,201 B2 | 4/2017 | Chen et al. |
| 9,921,660 B2 | 3/2018 | Poupyrev |
| 10,061,509 B2 | 8/2018 | Mese et al. |
| 10,088,908 B1 | 10/2018 | Poupyrev et al. |
| 10,101,874 B2 | 10/2018 | Kwon et al. |
| 10,139,916 B2 | 11/2018 | Poupyrev |
| 10,284,541 B1 | 5/2019 | Subramanian et al. |
| 10,300,370 B1 | 5/2019 | Amihood et al. |
| 10,394,333 B2 | 8/2019 | Cheng et al. |
| 10,459,080 B1 | 10/2019 | Schwesig et al. |
| 10,823,841 B1 | 11/2020 | Lien et al. |
| 11,003,345 B2 | 5/2021 | Poupyrev et al. |
| 2002/0158838 A1 | 10/2002 | Smith et al. |
| 2003/0071750 A1 | 4/2003 | Benitz |
| 2003/0095154 A1 | 5/2003 | Colmenarez |
| 2003/0122651 A1 | 7/2003 | Doi et al. |
| 2006/0139314 A1 | 6/2006 | Bell |
| 2006/0256082 A1 | 11/2006 | Cho et al. |
| 2008/0030463 A1* | 2/2008 | Forest .................. G06F 3/04883 345/156 |
| 2008/0074307 A1 | 3/2008 | Boric-Lubecke et al. |
| 2008/0122796 A1 | 5/2008 | Jobs et al. |
| 2008/0168403 A1 | 7/2008 | Westerman et al. |
| 2008/0178126 A1 | 7/2008 | Beeck et al. |
| 2008/0278450 A1 | 11/2008 | Lashina |
| 2008/0300055 A1 | 12/2008 | Lutnick et al. |
| 2009/0191968 A1 | 7/2009 | Johnson et al. |
| 2009/0296930 A1 | 12/2009 | Krantz et al. |
| 2010/0045513 A1 | 2/2010 | Pett et al. |
| 2010/0060570 A1 | 3/2010 | Underkoffler et al. |
| 2010/0107099 A1 | 4/2010 | Frazier et al. |
| 2010/0192102 A1 | 7/2010 | Chmielewski et al. |
| 2010/0205667 A1 | 8/2010 | Anderson et al. |
| 2010/0306716 A1 | 12/2010 | Perez |
| 2011/0018795 A1 | 1/2011 | Jang |
| 2011/0119640 A1 | 5/2011 | Berkes et al. |
| 2011/0181509 A1 | 7/2011 | Rautiainen et al. |
| 2011/0181510 A1 | 7/2011 | Hakala et al. |
| 2011/0185318 A1 | 7/2011 | Hinckley et al. |
| 2011/0193939 A1 | 8/2011 | Vassigh et al. |
| 2011/0234492 A1 | 9/2011 | Ajmera et al. |
| 2011/0304541 A1 | 12/2011 | Dalal |
| 2011/0310005 A1 | 12/2011 | Chen et al. |
| 2012/0032834 A1 | 2/2012 | Weeks et al. |
| 2012/0069043 A1 | 3/2012 | Narita et al. |
| 2012/0110516 A1 | 5/2012 | Tumanov |
| 2012/0131229 A1 | 5/2012 | McCarthy et al. |
| 2012/0185910 A1 | 7/2012 | Miettinen et al. |
| 2012/0194551 A1 | 8/2012 | Osterhout et al. |
| 2012/0214594 A1 | 8/2012 | Kirovski et al. |
| 2012/0229377 A1 | 9/2012 | Kim et al. |
| 2012/0235790 A1 | 9/2012 | Zhao et al. |
| 2012/0270564 A1 | 10/2012 | Gum et al. |
| 2012/0280900 A1 | 11/2012 | Wang et al. |
| 2013/0106898 A1 | 5/2013 | Saint-Loubert-Bie et al. |
| 2013/0159940 A1 | 6/2013 | Duffy et al. |
| 2013/0191791 A1 | 7/2013 | Rydenhag et al. |
| 2013/0281024 A1 | 10/2013 | Rofougaran et al. |
| 2013/0316687 A1 | 11/2013 | Subbaramoo et al. |
| 2014/0028539 A1 | 1/2014 | Newham et al. |
| 2014/0118257 A1 | 5/2014 | Baldwin |
| 2014/0124647 A1 | 5/2014 | Hsu |
| 2014/0139430 A1 | 5/2014 | Leung |
| 2014/0270698 A1 | 9/2014 | Luna et al. |
| 2014/0332441 A1 | 11/2014 | Jayetileke et al. |
| 2014/0333431 A1 | 11/2014 | Abdelsamie et al. |
| 2014/0368378 A1 | 12/2014 | Crain et al. |
| 2015/0007049 A1 | 1/2015 | Langlois |
| 2015/0070263 A1 | 3/2015 | Murillo et al. |
| 2015/0077345 A1 | 3/2015 | Hwang et al. |
| 2015/0088283 A1 | 3/2015 | Fiedler et al. |
| 2015/0121108 A1 | 4/2015 | Agrawal et al. |
| 2015/0169071 A1 | 6/2015 | Jitkoff |
| 2015/0205358 A1 | 7/2015 | Lyren |
| 2015/0205821 A1 | 7/2015 | Kogan |
| 2015/0212641 A1 | 7/2015 | Tanneberger et al. |
| 2015/0277569 A1 | 10/2015 | Sprenger et al. |
| 2015/0301167 A1 | 10/2015 | Sentelle et al. |
| 2015/0324004 A1 | 11/2015 | Lee et al. |
| 2015/0346820 A1 | 12/2015 | Poupyrev et al. |
| 2015/0362986 A1 | 12/2015 | Lee et al. |
| 2016/0041617 A1 | 2/2016 | Poupyrev |
| 2016/0041618 A1 | 2/2016 | Poupyrev |
| 2016/0054803 A1 | 2/2016 | Poupyrev |
| 2016/0071341 A1 | 3/2016 | Menzel |
| 2016/0073351 A1 | 3/2016 | Cardozo et al. |
| 2016/0077202 A1 | 3/2016 | Hirvonen et al. |
| 2016/0098089 A1 | 4/2016 | Poupyrev |
| 2016/0150124 A1 | 5/2016 | Panda et al. |
| 2016/0179205 A1 | 6/2016 | Katz |
| 2016/0187992 A1 | 6/2016 | Yamamoto et al. |
| 2016/0216769 A1 | 7/2016 | Goetz et al. |
| 2016/0252607 A1 | 9/2016 | Saboo et al. |
| 2016/0261760 A1 | 9/2016 | Aso et al. |
| 2016/0275348 A1 | 9/2016 | Slaby et al. |
| 2016/0306034 A1 | 10/2016 | Trotta et al. |
| 2016/0306491 A1 | 10/2016 | Lee et al. |
| 2016/0320854 A1 | 11/2016 | Lien et al. |
| 2017/0010658 A1 | 1/2017 | Tanaka et al. |
| 2017/0052618 A1 | 2/2017 | Lee et al. |
| 2017/0097413 A1 | 4/2017 | Gillian et al. |
| 2017/0097684 A1 | 4/2017 | Lien |
| 2017/0115738 A1 | 4/2017 | Wei |
| 2017/0168630 A1 | 6/2017 | Khoshkava et al. |
| 2017/0192629 A1 | 7/2017 | Takada et al. |
| 2017/0243389 A1 | 8/2017 | Wild et al. |
| 2017/0289766 A1* | 10/2017 | Scott .................... H04W 8/005 |
| 2017/0329412 A1 | 11/2017 | Schwesig et al. |
| 2017/0358940 A1 | 12/2017 | Parikh et al. |
| 2018/0004301 A1 | 1/2018 | Poupyrev |
| 2018/0040144 A1 | 2/2018 | Li |
| 2018/0043246 A1 | 2/2018 | Chang |
| 2018/0052518 A1 | 2/2018 | Zhu et al. |
| 2018/0082656 A1 | 3/2018 | Ito et al. |
| 2018/0117447 A1 | 5/2018 | Tran |
| 2018/0157330 A1 | 6/2018 | Gu et al. |

(56) References Cited

U.S. PATENT DOCUMENTS

| | | | |
|---|---|---|---|
| 2018/0164893 | A1 | 6/2018 | Sperrhake et al. |
| 2018/0173323 | A1 | 6/2018 | Harvey et al. |
| 2018/0211024 | A1 | 7/2018 | Zhao et al. |
| 2018/0329050 | A1 | 11/2018 | Amihood et al. |
| 2019/0011993 | A1 | 1/2019 | Ette et al. |
| 2019/0079590 | A1 | 3/2019 | Tomizawa et al. |
| 2019/0087621 | A1 | 3/2019 | Khuri-Yakub et al. |
| 2019/0129520 | A1 | 5/2019 | Shin et al. |
| 2019/0138109 | A1 | 5/2019 | Poupyrev et al. |
| 2019/0187265 | A1 | 6/2019 | Barbello et al. |
| 2019/0260661 | A1 | 8/2019 | Amini et al. |
| 2019/0278339 | A1 | 9/2019 | Cooper et al. |
| 2019/0321719 | A1 | 10/2019 | Gillian et al. |
| 2020/0081560 | A1 | 3/2020 | Geller et al. |
| 2020/0142645 | A1 | 5/2020 | Wibbels et al. |
| 2020/0159897 | A1 | 5/2020 | Schmitt et al. |
| 2020/0219338 | A1 | 7/2020 | Chen et al. |
| 2020/0264765 | A1* | 8/2020 | Poupyrev ............ G06F 3/04847 |
| 2020/0372239 | A1 | 11/2020 | Schmitt et al. |
| 2020/0410072 | A1 | 12/2020 | Giusti et al. |
| 2021/0019441 | A1 | 1/2021 | Neves Creto et al. |
| 2021/0025976 | A1 | 1/2021 | Chandel et al. |
| 2021/0026454 | A1 | 1/2021 | Hong et al. |
| 2021/0027049 | A1 | 1/2021 | Chandel et al. |
| 2021/0029542 | A1 | 1/2021 | Prag et al. |
| 2021/0064142 | A1 | 3/2021 | Stern et al. |
| 2021/0064143 | A1 | 3/2021 | Stern et al. |
| 2021/0064144 | A1 | 3/2021 | Stern et al. |
| 2021/0064145 | A1 | 3/2021 | Stern et al. |
| 2021/0064146 | A1 | 3/2021 | Stern et al. |
| 2021/0103337 | A1 | 4/2021 | Jeppsson et al. |
| 2021/0103348 | A1 | 4/2021 | Jeppsson et al. |
| 2022/0026993 | A1 | 1/2022 | O'Reilley et al. |

FOREIGN PATENT DOCUMENTS

| | | |
|---|---|---|
| CN | 103502911 | 1/2014 |
| CN | 104838336 | 8/2015 |
| CN | 106062777 | 10/2016 |
| CN | 106339076 | 1/2017 |
| CN | 106537173 | 3/2017 |
| CN | 107710012 | 2/2018 |
| CN | 108781308 | 11/2018 |
| EP | 2385450 | 11/2011 |
| EP | 2770408 | 8/2014 |
| EP | 2953007 | 12/2015 |
| EP | 3267291 | 1/2018 |
| GB | 2548964 | 10/2017 |
| GB | 2575185 | 1/2020 |
| JP | 2016076061 | 5/2016 |
| KR | 20140027837 | 3/2014 |
| KR | 20150033182 | 4/2015 |
| KR | 20150112708 | 10/2015 |
| WO | 2004053601 | 6/2004 |
| WO | 2015149049 | 10/2015 |
| WO | 2015196063 | 12/2015 |
| WO | 2016022764 | 2/2016 |
| WO | 2017200571 | 11/2017 |
| WO | 2019118017 | 6/2019 |
| WO | 2019146032 | 8/2019 |
| WO | 2019206091 | 10/2019 |
| WO | 2020263250 | 12/2020 |
| WO | 2021021218 | 2/2021 |
| WO | 2021021219 | 2/2021 |
| WO | 2021021220 | 2/2021 |
| WO | 2021021224 | 2/2021 |
| WO | 2021021227 | 2/2021 |
| WO | 2021040742 | 3/2021 |
| WO | 2021040745 | 3/2021 |
| WO | 2021040747 | 3/2021 |
| WO | 2021040748 | 3/2021 |
| WO | 2021040749 | 3/2021 |

OTHER PUBLICATIONS

"Final Office Action", U.S. Appl. No. 15/596,702, dated Apr. 14, 2020, 27 Pages.
"Final Office Action", U.S. Appl. No. 15/287,394, dated Sep. 30, 2019, 38 Pages.
"Final Office Action", U.S. Appl. No. 15/596,702, filed Jun. 13, 2019, 21 pages.
"Final Office Action", U.S. Appl. No. 15/142,471, filed Jun. 20, 2019, 26 pages.
"First Action Interview Office Action", U.S. Appl. No. 16/080,293, dated Jul. 23, 2020, 3 Pages.
"First Action Interview Office Action", U.S. Appl. No. 15/142,471, dated Feb. 5, 2019, 29 pages.
"First Examination Report", GB Application No. 1621332.4, dated May 16, 2017, 7 pages.
"Foreign Office Action", Korean Application No. 1020197004803, dated Oct. 14, 2019, 2 pages.
"Foreign Office Action", Japanese Application No. 2018501256, dated Oct. 23, 2019, 5 pages.
"Foreign Office Action", British Application No. 1621332.4, dated Nov. 6, 2019, 3 pages.
"Foreign Office Action", DE Application No. 102016124419.8, dated Dec. 4, 2020, 9 pages.
"Foreign Office Action", Chinese Application No. 201611159870.9, dated Dec. 17, 2019, 15 pages.
"Foreign Office Action", Great Britain Application No. 1621332.4, dated May 16, 2017, 7 pages.
"Foreign Office Action", Japanese Application No. 2018156138, dated Sep. 30, 2019, 3 pages.
"Galaxy S4 Air Gesture", Galaxy S4 Guides, retrieved from: https://allaboutgalaxys4.com/galaxy-s4-features-explained/air-gesture/ on Sep. 3, 2019, 4 pages.
"International Search Report and Written Opinion", PCT Application No. PCT/US2016/065295, dated Mar. 14, 2017, 12 pages.
"Non-Final Office Action", U.S. Appl. No. 15/596,702, dated Aug. 19, 2020, 27 Pages.
"Non-Final Office Action", U.S. Appl. No. 15/791,044, dated Sep. 30, 2019, 22 Pages.
"Non-Final Office Action", U.S. Appl. No. 15/596,702, dated Jan. 4, 2019, 10 pages.
"Non-Final Office Action", U.S. Appl. No. 15/596,702, dated Oct. 21, 2019, 21 Pages.
"Non-Final Office Action", U.S. Appl. No. 16/080,293, dated Oct. 28, 2020, 40 pages.
"Notice of Allowance", U.S. Appl. No. 16/080,293, dated Feb. 23, 2021, 6 pages.
"Notice of Allowance", U.S. Appl. No. 15/142,471, dated Aug. 6, 2020, 7 Pages.
"Pre-Interview Communication", U.S. Appl. No. 16/080,293, dated Jun. 25, 2020, 3 Pages.
"Pre-Interview Communication", U.S. Appl. No. 15/142,471, dated Dec. 12, 2018, 3 pages.
"Preliminary Report on Patentability", PCT Application No. PCT/US2016/065295, dated Jul. 24, 2018, 18 pages.
"Samsung Galaxy S4 Air Gestures", Video retrieved from https://www.youtube.com/watch?v=375Hb87yGcg, May 7, 2013, 4 pages.
"Search Report", GB Application No. 2007255.9, dated Jul. 6, 2020, 1 page.
"Written Opinion", PCT Application No. PCT/US2016/065295, dated Apr. 13, 2018, 8 pages.
Amihood, et al., "Closed-Loop Manufacturing System Using Radar", Technical Disclosure Commons; Retrieved from http://www.tdcommons.org/dpubs_series/464, Apr. 17, 2017, 8 pages.
Antonimuthu, "Google's Project Soli brings Gesture Control to Wearables using Radar", YouTube[online], Available from https://www.youtube.com/watch?v=czJfcgvQcNA as accessed on May 9, 2017; See whole video, especially 6:05-6:35.
Duncan, "Motion Compensation of Synthetic Aperture Radar", Microwave Earth Remote Sensing Laboratory, Brigham Young University, Apr. 15, 2003, 5 pages.
Karagozler, et al., "Embedding Radars in Robots to Accurately Measure Motion", Technical Disclosure Commons; Retrieved from http://www.tdcommons.org/dpubs_series/454, Mar. 30, 2017, 8 pages.

(56) References Cited

OTHER PUBLICATIONS

Lien, et al., "Embedding Radars in Robots for Safety and Obstacle Detection", Technical Disclosure Commons; Retrieved from http://www.tdcommons.org/dpubs_series/455, Apr. 2, 2017, 10 pages.
"Foreign Office Action", DE Application No. 102016124419.8, dated Apr. 22, 2021, 17 pages.
"ControlAir on the Mac App Store", retrieved from https://apps.apple.com/om/app/controlair/id950009491 on Jun. 25, 19, 2 pages.
"Final Office Action", U.S. Appl. No. 16/601,452, dated Sep. 30, 2021, 15 pages.
"Final Office Action", U.S. Appl. No. 16/601,421, dated Mar. 30, 2021, 17 pages.
"Final Office Action", U.S. Appl. No. 16/871,945, dated Aug. 25, 2021, 46 pages.
"Foreign Notice of Allowance", KR Application No. 10-2019-0157394, dated Sep. 24, 2021, 3 pages.
"Foreign Office Action", KR Application No. 10-2019-0157394, dated Mar. 25, 2021, 10 pages.
"Foreign Office Action", CN Application No. 201980006096.3, dated Jul. 14, 2021, 18 pages.
"Foreign Office Action", KR Application No. 10-2019-0157391, dated Jan. 29, 2021, 8 pages.
"Foreign Office Action", KR Application No. 10-2019-0157391, dated Jul. 29, 2021, 9 pages.
"Intelligent Rendering of Readable Content onto Display Devices", Sep. 21, 2010, 4 pages.
"International Search Report and Written Opinion", Application No. PCT/US2019/049208, dated Mar. 26, 2020, 13 pages.
"International Search Report and Written Opinion", Application No. PCT/US2019/049216, dated Apr. 2, 2020, 14 pages.
"International Search Report and Written Opinion", Application No. PCT/US2019/049212, dated Mar. 26, 2020, 14 pages.
"International Search Report and Written Opinion", Application No. PCT/US2019/053676, dated Apr. 2, 2020, 14 pages.
"International Search Report and Written Opinion", Application No. PCT/US2019/049164, dated May 6, 2020, 14 pages.
"International Search Report and Written Opinion", Application No. PCT/US2019/055731, dated Mar. 26, 2020, 15 pages.
"International Search Report and Written Opinion", Application No. PCT/US2019/049225, dated May 6, 2020, 15 pages.
"International Search Report and Written Opinion", Application No. PCT/US2019/049204, dated May 4, 2020, 15 pages.
"International Search Report and Written Opinion", Application No. PCT/US2019/039306, dated Mar. 11, 2020, 17 pages.
"International Search Report and Written Opinion", Application No. PCT/US2019/049236, dated May 26, 2020, 17 pages.
"International Search Report and Written Opinion", Application No. PCT/US2019/049233, dated Apr. 20, 2020, 19 pages.
"Non-Final Office Action", U.S. Appl. No. 16/912,307, dated Mar. 19, 2021, 11 pages.
"Non-Final Office Action", U.S. Appl. No. 16/879,662, dated Sep. 16, 2021, 12 pages.
"Non-Final Office Action", U.S. Appl. No. 16/601,452, dated Mar. 24, 2021, 13 pages.
"Non-Final Office Action", U.S. Appl. No. 16/912,635, dated Jun. 11, 2021, 14 pages.
"Non-Final Office Action", U.S. Appl. No. 16/912,373, dated Apr. 1, 2021, 15 pages.
"Non-Final Office Action", U.S. Appl. No. 16/601,421, dated Oct. 2, 2020, 15 pages.
"Non-Final Office Action", U.S. Appl. No. 16/601,421, dated Sep. 14, 2021, 29 pages.
"Non-Final Office Action", U.S. Appl. No. 16/871,945, dated May 7, 2021, 41 pages.
"Non-Final Office Action", U.S. Appl. No. 16/871,945, dated Mar. 8, 2021, 41 pages.
"Notice of Allowance", U.S. Appl. No. 16/912,635, dated Aug. 19, 2021, 7 pages.
"Notice of Allowance", U.S. Appl. No. 16/912,307, dated Jun. 23, 2021, 8 pages.
"Pursuant to MPEP § 2001.6(b) the applicant brings the following co-pending application to the Examiner's attention: U.S. Appl. No. 16/601,421, filed Oct. 14, 2019".
Aboussouan, Eric, "Super-Resolution Image Construction Using an Array Camera", Technical Disclosure Commons; Retrieved from http://www.tdcommons.org/dpubs_series/643, Aug. 18, 2017, 7 pages.
Amihood, Patrick M. et al., "Closed-Loop Manufacturing System Using Radar", Technical Disclosure Commons; Retrieved from http://www.tdcommons.org/dpubs_series/464, Apr. 17, 2017, 8 pages.
Bardram, Jakob E. et al., "Context-Aware User Authentication—Supporting Proximity-Based Login in Pervasive Computing", Oct. 2003, pp. 107-123.
Colgan, Alex, "How Does the Leap Motion Controller Work?", Retrieved from http://blog.leapmotion.com/hardware-to-software-how-does-the-leap-motion-controller-work/, Aug. 9, 2014, 10 pages.
Felch, Andrew et al., "Standard Radar API: Proposal Version 0.1", Technical Disclosure Commons, Jan. 24, 2021, 18 pages.
Karagozler, Mustafa E. et al., "Embedding Radars in Robots to Accurately Measure Motion", Technical Disclosure Commons; Retrieved from http://www.tdcommons.org/dpubs_series/454, Mar. 30, 2017, 8 pages.
Lien, Jaime et al., "Embedding Radars in Robots for Safety and Obstacle Detection", Technical Disclosure Commons; Retrieved from http://www.tdcommons.org/dpubs_series/455, Apr. 2, 2017, 10 pages.
Oh, Kyongsae et al., "Gesture Sensor for Mobile Devices", Samsung Electronics Co., Ltd; White Paper, Jan. 2013, 12 pages.
Park, Kyoung S., "Development of Kinect-Based Pose Recognition Model for Exercise Game", May 2016, pp. 303-310.
Poupyrev, Ivan, "Welcome to Project Soli—Youtube", Retrieved at: https://www.youtube.com/watch?v=0QNiZfSsPc0, May 29, 2015, 1 page.
Yeeun, Jeon, "Brain Out—Blog", Retrieved at: https://blog.naver.com/junye2147/221658923923, Sep. 25, 2019, 29 pages.

\* cited by examiner

CONTROL-ARTICLE-BASED CONTROL OF A USER INTERFACE

RELATED APPLICATIONS

This application is a continuation of U.S. application Ser. No. 16/080,293, filed Dec. 7, 2016, which is a 35 U.S.C. § 371 national stage filing of PCT International Application No. PCT/US2016/065295, filed Dec. 7, 2016, which, in turn, claims priority under 35 U.S.C. § 119(e) to U.S. Provisional Patent Application Ser. No. 62/336,947, filed May 16, 2016, the disclosures of which are incorporated by reference herein in their entirety.

FIELD

The present disclosure relates generally to providing gesture-based control of a user interface associated with a user computing device.

BACKGROUND

As computing devices proliferate in homes, automobiles, and offices, the need to seamlessly and intuitively control these devices becomes increasingly important. For example, a user may desire to quickly and easily control the user's media players, televisions, climate devices, etc. from wherever the user happens to be.

The use of gestures to interact with computing devices has become increasingly common. Gesture recognition techniques have successfully enabled gesture interaction with devices when these gestures are made to device surfaces, such as touch screens for phones and tablets and touch pads for desktop computers. Users, however, are increasingly desiring to interact with their devices through gestures not made to a surface, such as through in-air gestures performed proximate a computing device.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of controlling operation of a computing device. The method includes detecting, by a user computing device, a presence of a control article in a first proximity zone proximate the user computing device. The method further includes responsive to detecting the presence of the control article in the first proximity zone, providing for display, by the user computing device, presentation data corresponding to a presentation mode of a user interface associated with the user computing device. The method further includes detecting, by the user computing device, a presence of the control article in a second proximity zone proximate the user computing device. The second proximity zone defines a separate physical area than the first proximity zone. The method further includes responsive to detecting the presence of the control article in the second proximity zone, providing for display, by the user computing device, interactive data corresponding to an interactive mode of the user interface.

Other example aspects of the present disclosure are directed to systems, apparatus, tangible, non-transitory computer-readable media, user interfaces, memory devices, and electronic devices for providing gesture-based control of a user interface.

For example, embodiments of the invention may provide a computer-implemented method of controlling operation of a user computing device, by a user moving or manipulating a control article, such as a part of their body or a separate object such as a stylus, wherein the user computing device is configured to provide a graphical user interface having at least a data presentation mode and an interactive mode. The method then comprises detecting if the control article is in a first proximity zone or a second proximity zone, for example these zones being defined relative to the device and being proximal to the device.

If the control article is detected to be in the first proximity zone then the data presentation mode is used for the graphical user interface. In this mode the data displayed may depend, for example, on position of the control article within the first proximity zone but not on control gestures made with the control article by the user. If the control article is detected to be in the second proximity zone then the interactive mode is used for the graphical user interface. The device may be configured such that in this mode the user may control the graphical user interface using gestures made with the control article, for example thereby controlling one or more actions of the device.

The data presentation mode and interactive mode may be mutually exclusive in the sense that the device is arranged to present only one of these modes to the user at any one time. Similarly, the first and second proximity zones may be mutually exclusive in the sense that the device is arranged to determine the control article to be in only one of these zones at any one time, and optionally to be in neither of these zones, and optionally to be in one or more further zones to which the device may respond with different functionality or modes of the graphical user interface.

The control article may be any suitable article or object or part of such article or object suitable for being detected and for performing control gestures recognizable by the user device. For example, the control article could be a finger, hand, head, eye, arm, etc. of a user, or an object held by the user such as a stylus.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
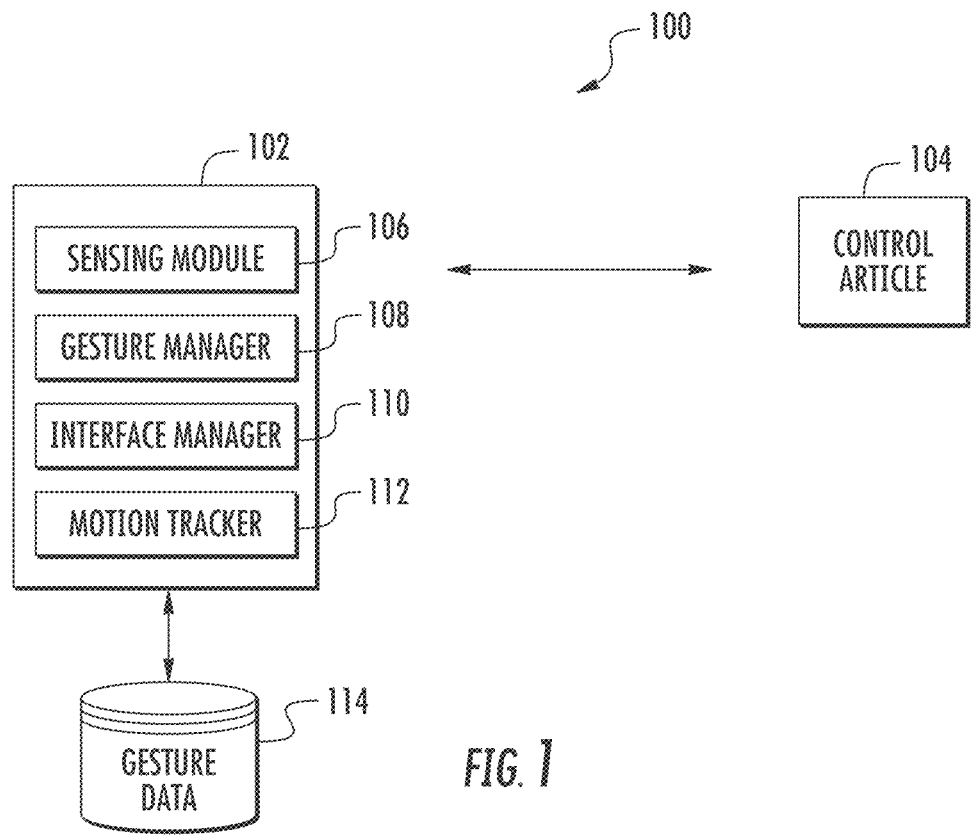
FIG. 1 depicts a block diagram of an example system for providing gesture-based control of a user interface according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to providing gesture-based control of a user interface associated with a user computing device (e.g. user device). For instance, the user device can detect a presence of a control article in one or more proximity zones proximate the user device, and can display data based at least in part on the presence of the control article within the proximity zones. The user interface associated with the user device can include one or more control modes. As an example, the user device can detect a presence of the control article in a first proximity zone, and in response, can provide for display presentation data corresponding to a presentation control mode of the user interface. The user device can further detect a presence of the user in a second proximity zone, an in response, can provide for display interactive data corresponding to an interaction control mode of the user interface.

More particularly, the user device can be a wearable computing device, smartphone, tablet, laptop computing device, desktop computing device, or any other suitable user device. The user device can be configured to monitor a motion of a control article (e.g. a hand of the user, an eye of the user, a head of the user, a stylus or other object controlled by the user and/or any other suitable control article) proximate the user device, and to determine one or more display configurations of the user interface based at least in part on the motion of the control article. In some implementations, the user device can include a radar module embedded within the user device configured to emit radio frequency (RF) energy in a direction of a target, and to receive return signals indicative of energy reflected back to the user device by a plurality of scattering points associated with the target. The radar module can include one or more antenna elements configured to transmit and/or receive RF energy. The received return signals can be used to detect a presence of the user and/or control article, to monitor a motion of the user and/or control article, and/or to determine one or more control gestures performed by the control article.

As indicated, the data displayed by the user interface of the user device can be determined based at least in part on a location of the control article relative to the user device. For instance, one or more proximity zones can be established proximate the user device. The proximity zones can be determined based at least in part on an antenna beam pattern formed by the one or more antenna elements associated with the user device. In some implementations, each proximity zone can have a corresponding control mode associated with the user interface. For instance, the first proximity zone can correspond to a presentation mode associated with the user interface, and the second proximity zone can correspond to an interactive mode associated with the user interface. In this manner, the user device can determine a control mode in which to operate based at least in part on a location of the control article relative to the user device. For instance, upon detection of the control article in the first proximity zone, the user device can operate in the presentation mode. As another example, upon detection of the control article in the second proximity zone, the user device can operate in the interactive mode.

While operating in the presentation mode, the user interface can display presentation display data associated with one or more applications implemented by the user device. For instance, the user device can implement or otherwise be associated with one or more applications. Such applications can include one or more messaging applications, weather applications, notification applications, calendar applications, and/or various other suitable applications. In implementations wherein the user computing device is a wearable computing device, such as a smartwatch, the applications associated with the user interface can appear as complications on or otherwise associated with the smartwatch face. In some implementations, the presentation data can be non-interactive data associated with an application hosted by the user device. In this manner, a user of the user device may not be able to interact with the presentation data. As a non-limiting example, the presentation data can include non-interactive data associated with a messaging application. Such data can include data associated with one or more email messages, SMS messages, instant messages, and/or other suitable electronic messages received by the user device.

While operating in the interactive mode, the user interface can display interactive display data associated with one or more available applications hosted by the user device, such that a user of the user device can interact with the data and/or the user interface. For instance, the interactive data can include icons or other indicators associated with the one or more available applications associated with the user device. Similar to the presentation mode, in some implementations, the icons or other indicators can appear as complications associated with a smartwatch face. The user may be able to scroll or cycle through the one or more applications, select the one or more applications, scroll or cycle within a selected application, select one or more or user interface elements within an application, and/or perform any other suitable interactions with the interactive data. For instance, a user device according to example embodiments of the present disclosure may include a messaging application, a weather application and a notification application. While the user device is operating in the interactive mode (e.g. in response to a detection of a presence of the control article in the second proximity zone), the user may scroll through the included applications and select an application to cause the application to run on the user device. The user may further interact with a running application by scrolling or cycling through the application, or selecting one or more user interface elements associated with the application.

In some implementations, the user can interact with the user device through the use of one or more control gestures. For instance, the control gestures can include in-air gestures performed by the control article proximate the user device (e.g. while the control article is located in the second proximity zone). The control gestures can correspond to in-air movement patterns performed by the control article. In this manner, the user device can be configured to detect a performance of a control gesture, and to perform one or more actions in response to the detection. In some implementations, the user device can begin monitoring for control gesture performances in response to detecting the presence of the control article in the second proximity zone.

The user device can have a set of predetermined control gestures for which the user device will be responsive. For instance, the user device can store data indicative of such control gesture set and one or more corresponding actions to respectively perform in response to detection of a performance of a control gesture. In this manner, the user device can compare a detected movement pattern performed by the control article to determine a match between the movement pattern and a control gesture from the set of control gestures. If a match is determined, the user device can perform an action or operation corresponding to the control gesture.

In some implementations, the presentation data displayed in response to a detection of the control article in the first proximity zone can be determined based at least in part on a location of the control article within the first proximity zone. As indicated above, such presentation data can correspond to one or more applications that appear as complications associated with a user interface displayed on a smartwatch face. For instance, the first proximity zone may include one or more subzones located within the first proximity zone. In some implementations, the number of subzones can be determined based at least in part on an amount of information to be displayed. For instance, a first application may have a first number of subzones based at least in part on an amount of information associated with the first application and a second application may have a second number of subzones based at least in part on an amount of information associated with the second application. The user device can determine a presence of the control article within the one or more subzones, and can determine presentation data to display based at least in part on the location of the control article relative to the one or more subzones. For instance, if the control article is located within a first subzone of the first proximity zone, the user device can provide for display first presentation data (e.g. one or more complications). If the control article is located within a second subzone of the first proximity zone, the user device can provide for display second presentation data (e.g. one or more complications). In this manner, the presentation data displayed by the user device can vary with the location of the control article within the first proximity zone.

As an example, a user device, such as a smartwatch device, can detect the control article within the first subzone while a messaging application associated with the smartwatch device is running. The smartwatch device can determine first presentation data associated with the messaging application to be displayed. The first presentation data can include or otherwise be associated with data associated with one or more complications displayed by the user interface of the smartwatch device. For instance, the first presentation data can include data indicative of one or more messages received (e.g. unread messages) by the user device, such as an identification of a sender of the one or more messages and/or an indication of the number of messages. As the control article moves towards the user device into the second subzone, the user device can detect the control article within the second subzone. The user device can determine and provide for display second presentation data associated with the messaging application. The second presentation data can include or otherwise be associated with additional or different data associated with the one or more complications. For instance, the second presentation data may include at least a portion of a body (e.g. the first 10 words of the message body) of a received message.

In some implementations, the presentation data can be provided for display in a progressive manner, such that additional or different information is provided for display in response to an approach of the control article towards the user device. For instance, the density of displayed information can gradually increase as the control article approaches the use device. As an example, a number of complications and/or data associated with a complication can increase as the control article approaches the user device. In this manner, the user can control the amount of information and/or the type of information displayed based at least in part on a distance of the control article from the use device. The user can position the control article at one or more locations relative to the user device to facilitate display of desired information. For instance, if the user desires to interact with the data, the user may position the control article within the second proximity zone. If the user desires merely to view information associated with an application (e.g. a number of unread messages), the user may position the control article in the first proximity zone (e.g. in an appropriate subzone of the first proximity zone). In this manner, while operating in presentation mode, the user device can respond to a location of the control article. While operating in interactive mode, the user device can respond to a control gesture performed by the control article.

In some implementations, feedback may be provided to the user to facilitate an understanding by the user of a status or operating mode of the user device. For instance, visual or audio feedback may be provided to the user to indicate to the user that the user has crossed a threshold to enter the first or second proximity zone, and/or one or more subzones. For instance, the user interface may include a progress bar indicative of a distance or location of the control article relative to the user device and/or to one or more proximity zones or subzones associated with the user device. Such progress bar can progress or regress as the distance between the control article and the user device progresses and regresses. As another example, the user interface may provide a lighting pattern and/or varying lighting brightness to indicate that the user device is operating in a particular control mode. In some implementations, one or more audio tones may be played by the user device to provide various indications to the user.

The user device can further operate in a standby control mode. For instance, the user device can operate in the standby mode when the user device does not detect a presence of the control article (e.g. in the first or second proximity zones). While operating in standby mode, the user device can provide for display standby data associated with the user device. Such standby data can include data associated with the user device, such as battery life, connection data, notification data, and/or other data. In some implementations, the standby data can include temporal data indicative of a current time and/or data. For instance, in such implementations, the user interface may be configured as a watch face having an hour hand and a minute hand, or other temporal indicator. While operating in standby mode, the user device can monitor for a control article. When the user device detects a presence of the control article, the user device can exit standby mode and operate in presentation mode or interactive mode (e.g. depending on the location of the detected control article).

With reference now to the figures, example embodiments of the present disclosure will be discussed in greater detail. For instance, FIG. 1 depicts an example system 100 for providing gesture-based control of a user interface according to example embodiments of the present disclosure. System 100 includes a user device 102 and a control article 104. Control article 104 can include any suitable article or object capable of performing control gestures recognizable by user device 102. In some implementations, control article can be a limb or other body part associated with a user. For instance, control article 104 can be a hand, head, eye, arm, etc. of the user. In some implementations, control article can be an object capable of being carried by the user, such as a stylus or other object.

User device 102 can be any suitable user computing device, such as a smartphone, tablet, wearable computing device (e.g. smartwatch), laptop computing device, desktop computing device, or any other suitable user computing device. User device 102 includes a sensing module 106, a gesture manager 108, an interface manager 110, and a motion tracker 112. In some implementations, sensing module 106 can include one or more sensing devices such as one or more optical cameras, infrared cameras, capacitive sensors, inductive sensors, and/or various other suitable sensing devices. In some implementations, sensing module 106 can be a radar module. For instance, sensing module 106 can include one or more antenna elements configured to emit and/or receive RF energy signals. For instance, such RF energy signals can be propagated in a direction determined by an antenna beam pattern formed by the one or more antenna elements. In some implementations, the RF energy signals can be propagated in a general direction of control article 104. In this manner, the propagated energy signals can be absorbed or scattered by control article 104. The energy signals coherently scattered back in a direction of user device 102 can be intercepted by the (receiving) antenna elements.

The received energy signals can be provided to motion tracker 112. Motion tracker 112 can be configured to monitor a motion of control article 104. For instance, motion tracker 112 can determine a motion profile associated with control article 104. The motion profile can include information associated with the motion of the control article during one or more time periods. For instance, the motion profile can include velocity data, location data (e.g. radial distance, spatial coordinates), and/or other data associated with the motion of the control article during the one or more time periods. In this manner, temporal changes associated with the motion of the control article can be tracked or otherwise monitored.

The motion profile can be used to control a user interface provided for display by user device 102. For instance, the motion profile can be used to detect a presence of control article 104 within one or more proximity zones or subzones proximate user device 102. For instance, user device 102 may have one or more associated proximity zones having predetermined boundaries determined based at least in part on an antenna beam pattern or other sensing pattern associated with sensing module 106. Detection of a presence of control article 104 in a proximity zone can trigger user device 102 to operate in a particular control mode. For instance, motion tracker 112 can detect a presence of control article 104 within a particular proximity zone by comparing location data (e.g. spatial coordinates, radial distance, etc.) to a location of the one or more boundaries of a proximity zone.

As indicated, a control mode in which user device 102 operates can be determined based at least in part on the location of control article 104 relative to the predetermined proximity zones. For instance, interface manager 110 can control user device 102 to operate in a particular control mode. In some implementations, interface manager 110 can control user device 102 to operate in a standby mode, a presentation mode, or an interactive mode based at least in part on the location of control article 104 relative to a first proximity zone and a second proximity zone.

The second proximity zone can be a physical area or region adjacent to user device 102, and the first proximity zone can be a physical area or region adjacent to the second proximity zone, such that the second proximity zone separates the first proximity zone and user device 102. As indicated, the boundaries of the first and second proximity zones can be determined based at least in part on an antenna beam pattern associated with sensing module 106. For instance, the boundaries of the second proximity zone can be determined such that user device 102 can detect control gestures performed by control article 104 to a sufficient degree while control article 104 is located within the second proximity zone. Similarly, the boundaries of the first proximity zone can be determined such that user device 102 can sufficiently track a motion of control article 104 while control article 104 is located in the first proximity zone. Proximity zones can have any suitable shape. In some implementations, the shape of the proximity zones can be determined based at least in part on the antenna beam pattern.

As indicated, interface manager 110 can coordinate or regulate data to be displayed on a display device associated with user device 102 based at least in part on a presence of control article 104 within the first proximity zone or the second proximity zone. For instance, interface manager 110 can control user device 102 to operate in a standby mode when control article 104 cannot be detected in the first or second proximity zone. The standby mode can include a provision for display on the user interface of standby data, such as temporal data associated with a current date or time. When control article 104 is detected within the first proximity zone, interface manager 110 can control user device 102 to operate in a presentation mode. The presentation mode can include a provision for display of non-interactive data associated with an application currently running on user device 102. For instance, the currently running application can be the application with which the user last interacted with. The presentation mode can include a progressive reveal of data associated with the application based at least in part on a location of control article 104 within the first proximity zone. For instance, as control article 104 approaches user device 102, additional presentation display data can be provided for display. For instance, the additional data can replace previously displayed data, or the additional data can be new data displayed in addition to the previously displayed data such that the additional data and the previously displayed data are displayed simultaneously. When control article 104 crosses a threshold or boundary separating the first proximity zone and the second proximity zone, interface manager 110 can control user device 102 to operate in an interactive mode. The interactive mode can include a provision for display of interactive data, such that the user can interact with or manipulate the data as displayed by the use interface. For instance, the interactive data can be associated with one or more available applications associated with user device 102. For instance, the user can scroll through and select an application to cause the selected application to run on user device 102. The user can then interact with data within the selected application. As indicated, the user can interact with such interactive data through a performance of one or more control gestures. For instance, the user can cause control article 104 to move in accordance with one or more movement patterns to prompt user device 102 to perform one or more actions.

While user device 102 is operating in the interactive control mode (e.g. while control article 104 is located in the second proximity zone), gesture manager 108 can be configured to determine a control gesture (e.g. in-air hand gesture) performed by control article 104. For instance, gesture manager 108 can access gesture data 114 to match a movement pattern performed by control article 104 with a control gesture associated with gesture data 114. In particular, gesture data 114 can include a set of predetermined control gestures. Each predetermined control gesture can be mapped to an action or operation to be performed by user device 102 in response to recognition of a movement pattern performed by control article 104 that matches the control gesture. In this manner, gesture manager 108 can compare the determined motion profile associated with control article 104 against gesture data 114 to determine if the motion profile matches a predetermined control gesture. When the motion profile matches a control gesture, user device 102 can perform the action or operation corresponding to the matched control gesture.

The control gestures can include a motion component. For instance, in implementations wherein control article 104 is a hand of the user, a control gesture may correspond to some predetermined movement of the hand and/or the digits of the hand, such as hand and/or digit translation, rotation, extension, flexion, abduction, opposition or other movement. As another example, in implementations wherein control article 104 is the head of the user, a control gesture can correspond to some predetermined movement of the head, such as an extension, rotation, bending, flexion or other movement. As yet another example, in implementations, wherein control article 104 is an external object, such as a stylus carried by the user, a control gesture can correspond to some predetermined motion pattern of the stylus. In some implementations, gesture manager 108 can be configured to recognize gestures performed by a plurality of control articles. For instance, gesture manager 108 can be configured to recognize a first control gesture as performed by a user hand, and a second control gesture performed by a user head. In this manner, gesture data 114 can include control gestures associated with each of the plurality of control articles.

Movement patterns performed by various components of control article 104 can be observed individually. For instance, movements associated with each finger of a hand can be individually monitored. In some implementations, the motion of one or more components of control article 104 can be tracked relative to one or more other components of control article 104. For instance, movement of a first digit of a hand can be tracked relative to movement of a second digit of the hand.

In some implementations, gesture data 114 can include data associated with a representative model of control article 104. For instance, gesture data 114 can include a model of a human hand that provides relational positional data for a hand and/or digits of the hand. In some implementations, such control article model can facilitate predictive tracking even when parts of control article 104 are not visible. For instance, in such implementations, signals associated with the visible parts of control article 104 can be used in conjunction with the control article model and/or past observations of control article 104 to determine one or more likely positions of the parts of control article 104 that are not currently visible.

Figure 2:
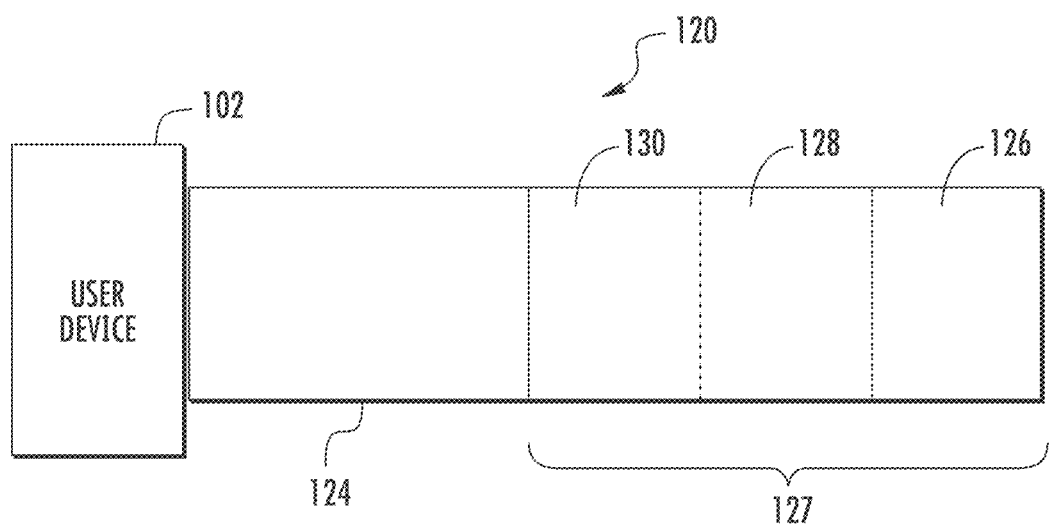
FIG. 2 depicts an example proximity zone configuration according to example embodiments of the present disclosure.

FIG. 2 depicts an example proximity zone configuration 120 according to example embodiments of the present disclosure. Proximity zone configuration 120 includes a first proximity zone 122 and a second proximity zone 124. As shown, first proximity zone 122 can correspond to a far zone and second proximity zone 124 can correspond to a near zone relative to user device 102. Second proximity zone 124 extends outwardly from user device 102 and first proximity zone 122 extends outwardly from second proximity zone 124. In this manner, second proximity zone 124 can define a separate physical or spatial area than first proximity zone 122. Detection of control article 104 (e.g. as depicted in FIG. 1) within the proximity zone configuration 120 can trigger one or more actions by user device 102.

The zone configuration 120 can be determined based at least in part on sensing module 106. For instance, the zone configuration 120 can be determined based at least in part on an antenna beam pattern formed by the one or more antenna elements of sensing module 106. The antenna beam pattern can represent an area proximate user device 102 in which user device 102 is capable of detecting or sensing objects. For instance, the antenna elements can emit RF energy signals in the general shape of the antenna beam pattern, and objects within the antenna beam pattern can be observed by user device 102. The proximity zone configuration 120 can form one or more partitions of the antenna beam pattern. In this manner, the shape and size of first proximity zone 122 and/or second proximity zone 124 can be determined based at least in part on the antenna beam pattern. For instance, first proximity zone 122 can form a first partition of the antenna beam pattern and second proximity zone 124 can form a second partition of the antenna beam pattern. In this manner, the various partitions defining the proximity zone configuration 120 can substantially define the antenna beam pattern. It will be appreciated that various other interaction zone arrangements can be used without deviating from the scope of the present disclosure, such as a proximity zone configuration that defines a portion of the antenna beam pattern. For instance, although first proximity zone 122 and second proximity zone 124 are depicted as rectangular in shape, such depiction is intended for illustrative purposes only. One or more proximity zones according to example embodiments of the present disclosure can have various other suitable shapes and/or sizes.

In some implementations, when control article 104 is detected within first proximity zone 122, user device 102 can begin monitoring the motion of control article 104. For instance, user device 102 can determine a motion profile associated with control article 104. Further, detection of control article 104 in first proximity zone 122 can trigger operation of user device 102 in a presentation mode. As indicated, the presentation mode can include a display of non-interactive presentation data on a user interface associated with user device 102. The presentation data can include data associated with a currently running application associated with user device 102. As indicated, in some implementations, the presentation data can be provided for display in a progressive manner based at least in part on a variation of location of control article 104 within first proximity zone 122.

In some implementations, first proximity zone 122 can include one or more subzones located within first proximity zone 122. For instance, the one or more subzones can partition at least a portion of first proximity zone 122. The subzones can be used to trigger the provision of display of presentation data. In some implementations, the subzones can correspond to distance thresholds within proximity zone 122. For instance, user device 102 can provide for display first presentation data in response to a detection of control article 104 within a first subzone 126. The first presentation data can include first display data associated with the currently running application. For instance, if the currently running application is a weather application, the first display data may include a current temperature associated with one or more geographical regions.

In response to a detection of control article 104 within a second subzone 128, user device 102 can provide for display second presentation data. The second presentation data can include second display data associated with the currently running application. For instance, if the weather application is the currently running application, the second display data may include a current status of weather in the one or more geographic regions. For instance, the second display data can specify a current sky coverage status (sunny, partly cloudy, mostly cloudy, etc.), a precipitation status, and/or other display data. In some implementations, the second display data can include an estimated duration of the current status. The second display data can be provided for display in addition to the first display data or as a replacement to the first display data. For instance, in some implementations, the first display data and the second display data can be simultaneously displayed. In alternative implementations, in response to control article 104 entering second subzone 128 from first subzone 126, the first display data can be removed from display and replaced by the second display data.

In response to a detection of control article 104 within a third subzone 130, user device 102 can provide for display third presentation data. The third presentation data can include third display data associated with the currently running application. For instance, if the weather application is the currently running application, the third display data may include additional information related to the current weather, such as a forecast, or notable expected upcoming weather events. The third display data may be displayed in addition to the first display data and/or the second display data or as a replacement to the first display data and/or the second display data.

As indicated, the provision for display of the various presentation data can implement a progressive "rollout" of the data. For instance, as control article 104 approaches or retreats from user device 102, the various presentation data can be displayed or removed from display in a responsive, intuitive manner to provide an affordance to the user associated with the interaction of the user with user device 102. In some implementations, the presentation data can be "rolled" onto the display device to simulate a scrolling of the display data relative to the display device. For instance, a first portion of the presentation data can be displayed prior to a second portion of the presentation data. The first portion can be translated in one or more directions relative to the user interface to allow room for the second portion of the presentation data. For instance, the presentation data can be provided in a list format, each entry of the list being scrolled on and off the screed based at least in part on the location of control article 104 in relation to user device 102. For instance, the data can be scrolled in a forward direction as control article 104 approaches user device 102, and in a reverse direction as control article 104 retreats from user device 102.

As control article 104 moves into second proximity zone 124, user device 102 can initiate operation in an interactive mode. The interactive mode can allow for an interaction by user with the user interface. As indicated, the interaction can be provided through the performance of control gestures by control article 104. For instance, while control article 104 is located in second proximity zone 124, user device 102 can monitor for control gestures performed by control article 104.

For instance, user device 102 can compare the motion profile associated with control article 104 to gesture data 114 to determine a match between a movement pattern of control article 104 and a control gesture associated with gesture data 114. If a match is determined, user device 102 can interpret the movement pattern of control article 104 as a control gesture, and can determine one or more actions or operations to perform in response to the performance of the control gesture. In some implementations, a match can be found between the movement pattern and a control gesture by based at least in part on a level at which user device 102 is certain that the movement pattern was intended to be a control gesture. For instance, user device 102 can compare the movement pattern against gesture data 114 to determine a percentage of likelihood (e.g. certainty) that the movement pattern was intended to be a control gesture. If the percentage of likelihood is greater than a threshold, a match can be determined.

In response to detection of a performance of a control gesture by control article 104, user device 102 can perform one or more corresponding actions or operations. For instance, such actions or operations can include user interface control actions. The user interface control actions can be contextual based at least in part on a current context of the user interface. In this manner, the control gestures can be configured to allow a user to navigate through the user interface to view or manipulate information displayed on the user interface. For instance, actions to be performed in response to the control gestures can include scroll actions, selection actions, zoom actions, and/or other suitable user interface control actions. In this manner, the user can navigate through one or more applications associated with user device 102, and can select an application to cause the application to run on user device 102 through the performance of control gestures (e.g. in-air hand gestures). The user may then be able to navigate through the selected application to view or manipulate data within the application.

When control article 104 is removed from second proximity zone 124, user device 102 can cease monitoring for control gestures. In some implementations, the application that the user was interacting with immediately prior to the removal of control article 104 from second proximity zone 124 can remain running on the user device. In this manner, when control article 104 is subsequently detected within first proximity zone 122, user device 102 can provide for display presentation data associated with such currently running application.

As indicated above, when control article 104 is not detected within first proximity zone 122 or second proximity zone 124, user device 102 can operate in a standby mode. While operating in the standby mode, user device 102 can provide for display standby data on the user interface. Such standby data can include temporal information associated with a current date and time or other information. In some implementations, the standby data can be configured to simulate a face of a watch.

It will be appreciated that proximity zone configuration 120 is depicted for illustrative purposes only. For instance, various other proximity zone configurations can be used without deviating from the scope of the present disclosure. In particular, various other suitable proximity zone configurations having various other proximity zone amounts, sizes, shapes, etc. can be used without deviating from the scope of the present disclosure. In addition, one or more proximity zones may include any suitable number of subzones. As indicated above, the amount of subzones may be determined based at least in part on an amount of display data to be displayed, and/or a desired manner in which the display data is to be displayed. For instance, the subzones can be configured to allow for a "rollout" of data in a progressive manner, such that a desired number of data iterations (e.g. first, second, third, etc. presentation data) are displayed.

FIGS. 3-8 depict example display configurations of an example user interface 200 according to example embodiments of the present disclosure. As shown, user interface 200 can be associated with a wearable computing device such as a smartwatch. In particular, user interface 200 can be displayed on a display device associated with a face of the smartwatch. However, it will be appreciated that various other suitable user interfaces associated with various other suitable user devices can be used without deviating from the scope of the present disclosure. Such display configurations of user interface 200 can be determined based at least in part on a location of control article 104 relative to user device 102. For instance, in some implementations, such display configurations can be determined based at least in part on a presence of control article 104 within proximity zone configuration 120 depicted in FIG. 2.

Figure 3:
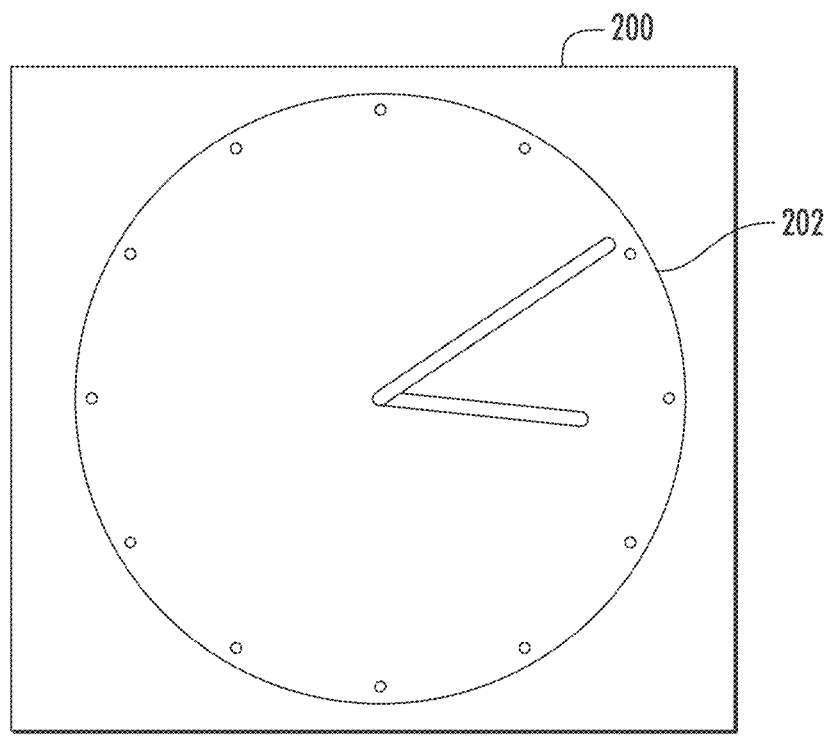
FIGS. 3-8 depict example display configurations according to example embodiments of the present disclosure.

For instance, FIG. 3 depicts display configuration 202 displayed on user interface 200. Display configuration 202 can correspond to a standby mode of user device 102. As shown, display configuration 202 includes standby data configured as a watch face specifying a current time. For instance, display configuration 202 depicts a watch face having a minute hand and an hour hand specifying a current time. Display configuration 202 can be displayed on user interface 202 when control article 104 is not detected within a proximity zone configuration, such as proximity zone configuration 120 or other proximity zone configuration associated with user device 102.

Figure 4:
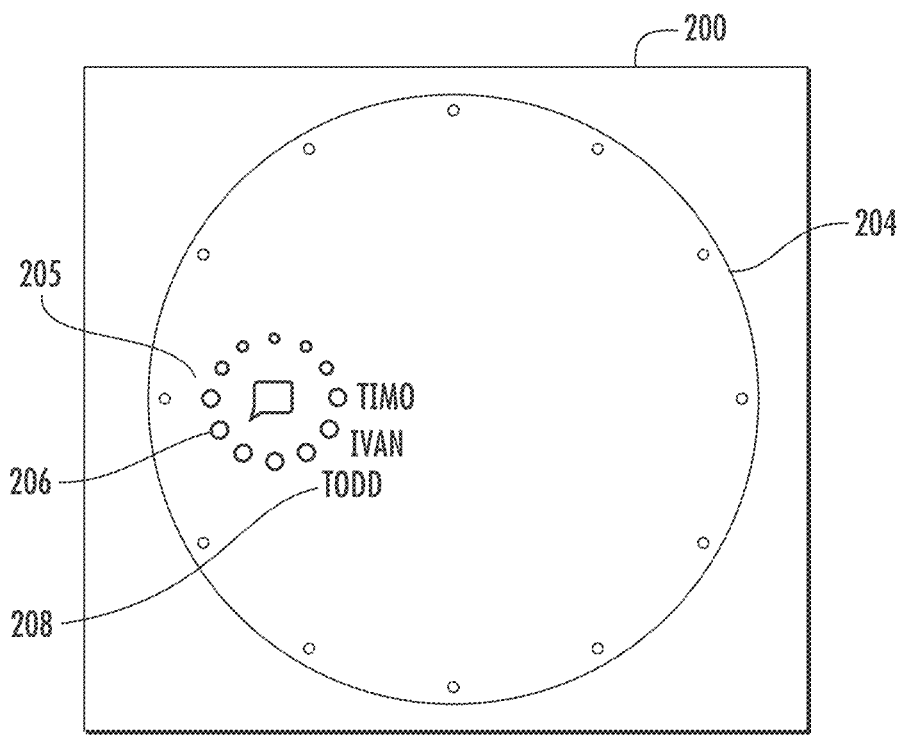

When user device 102 detects control article 104 within first proximity zone 122, user device 102 can initiate operation in a presentation mode. For instance, FIG. 4 depicts display configuration 204 associated with user interface 200. Display configuration 204 can correspond to the presentation mode configured to display non-interactive data associated with a currently running messaging application. In this manner, display configuration 204 can display first presentation data associated with user interface 200. For instance, when user device 102 detects control article 104 within first proximity zone 122, user device 102 can provide for display presentation data associated with display configuration 204. Such presentation data includes an application icon 205. Application icon 205 is associated with the messaging application installed on user device 102 As shown, application icon 205 can correspond to a complication associated with user interface 200 displayed on the watch face. As shown, application icon 205 includes or is otherwise associated with message indicators 206, and sender identifiers 208 associated with the messaging application. In this manner, display configuration 204 can provide a user with first presentation data indicative of an initial indication of unread or received messages. In some implementations, message indicators 206 and/or sender identifiers 208 can be scrolled onto user interface 200 based at least in part on the location of control article 104. For instance, message indicators 206 and/or sender identifiers can be configured to scroll on or off of user interface 200 on an individual basis as control article 104 approaches or retreats from user device 102.

As an example, as control article 104 approaches user device 102 the message indicator 206 and/or sender identifier 208 associated with the message from Todd can be displayed on user interface 200 prior to the message indicator 206 and/or sender identifier 208 associated with the messages from Ivan and Timo. In some implementations, the messages can be listed in the order of arrival of the messages. In some implementations, the message indicator 206 and/or sender identifier 208 can be scrolled off of user interface 200 to make room for one or more additional message indicators and/or sender identifiers to be displayed.

Figure 5:
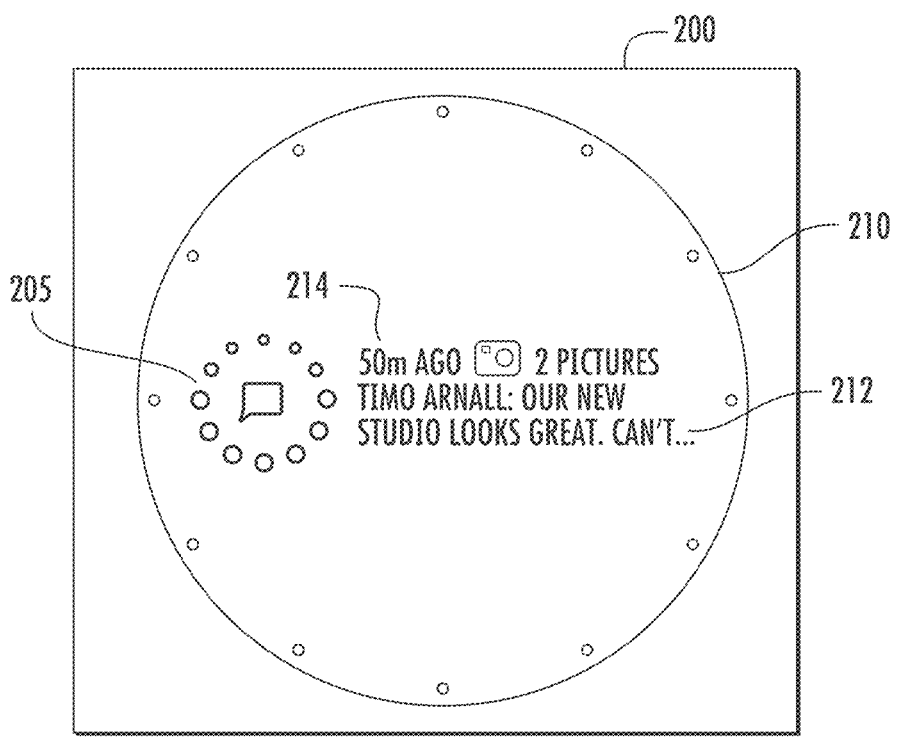

As control article 104 approaches user device 102, user device 102 can display additional or different presentation data. For instance, FIG. 5 depicts an example display configuration 210. Display configuration 210 can correspond to second presentation data displayed on user interface 200 while operating in the presentation mode. As shown, the second presentation data can include additional data to the first presentation data corresponding to display configuration 204. The second presentation data can be presentation data associated with application icon 205. For instance, the second presentation data includes a message preview 212 depicting a portion of the message from Timo. The second presentation data further includes a timing of receipt indicator 214.

The first presentation data of display configuration 204 and the second presentation data of 206 can be displayed based at least in part on a location of control article 104 with first proximity zone 122. For instance, the first presentation data can be displayed while control article 104 is present in subzone 126 and the second presentation data can be displayed when control article 104 crosses into subzone 128. In some implementations, display of the first and second presentation data can be triggered by a crossing of control article 104 of one or more distance thresholds associated with first proximity zone 122.

Figure 6:
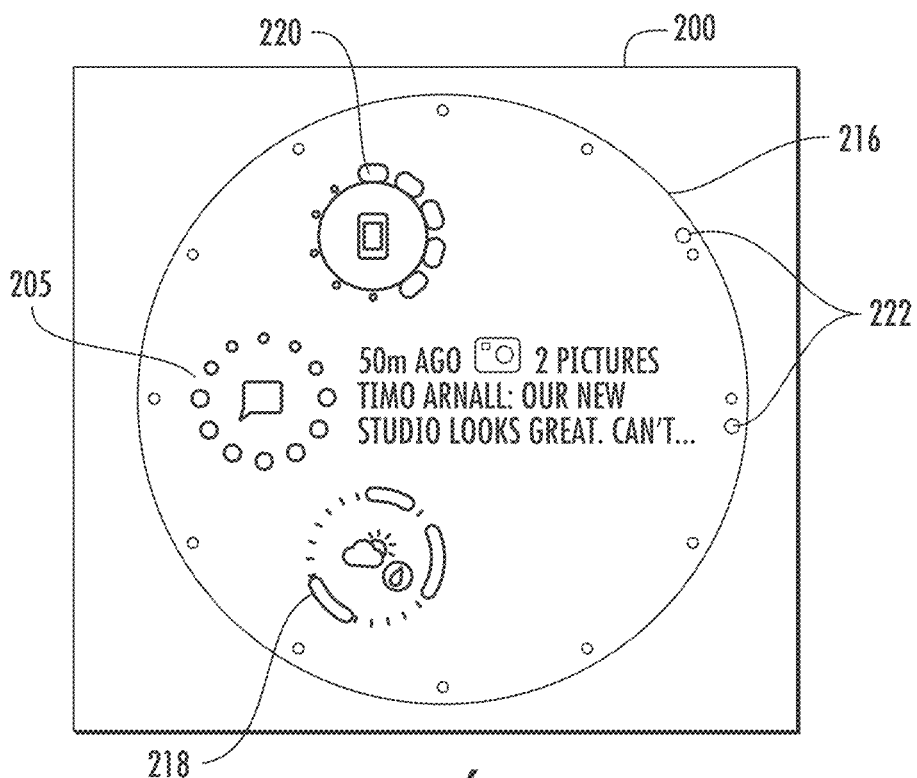

When control article 104 enters second proximity zone 124, user device 102 can initiate operation in the interactive mode. While in interactive mode user device 102 can provide for display interactive data on user interface 200. For instance, FIG. 6 depicts display configuration 216. Display configuration 216 can correspond to the interactive mode of user device 102. When control article 104 enters second proximity zone 124, user device 102 can begin monitoring for control gestures. Upon detection of a performance of a control gesture by control article 104, user device 102 can perform one or more user interface actions based on the detected control gesture.

As shown, display configuration 216 depicts the message preview 212. Display configuration 216 further depicts application icons 218 and 220. Application icons 218 and 220 can correspond to applications installed on user device 102. Similar to application icon 205, application icons 218 and 220 appear a complications associated with the smartwatch face. Display configuration 216 further depicts temporal indicators 222. For instance, temporal indicators correspond to the watch hands of the temporal data depicted in display configuration 202. Temporal indicators can move as watch hands move to reflect the changing time.

Figure 7:
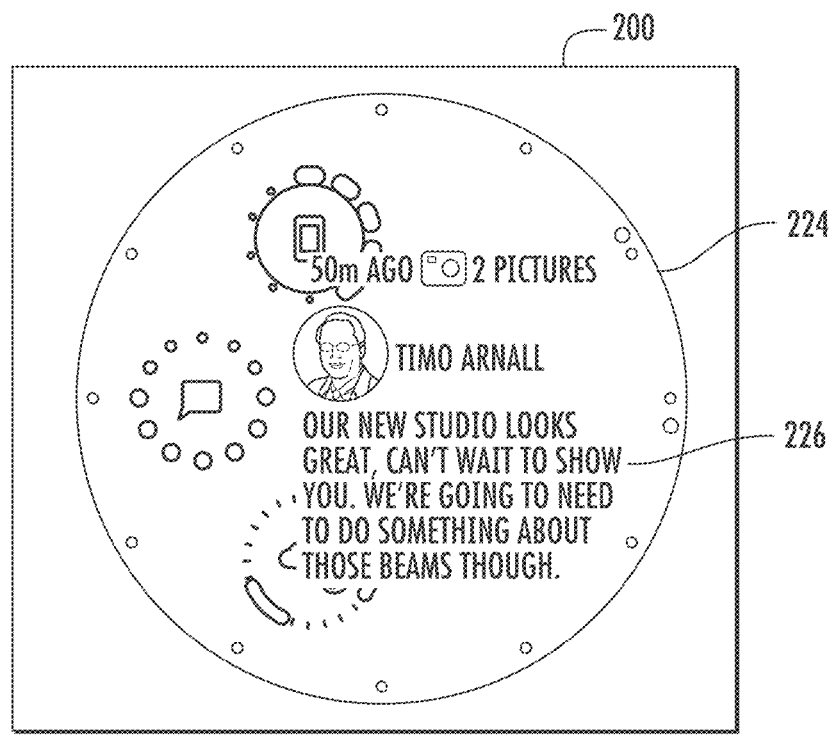

While operating in the interactive mode, user device 102 can accept control gesture inputs as performed control article 104, and can control user interface 200 based at least in part on the control gestures. As indicated, each control gesture of a predetermined set of control gestures can correspond to a contextual user interface control action to be performed in response to a detection of a performance of the control gesture by control article 104. For instance, the user can perform control gestures (e.g. by manipulation of control article 104) to prompt the user device to control user interface 200 in a desired manner. For instance, the user can interact with the messaging application to select one or more messages to display in full. As shown in FIG. 7, upon a selection of a message, user device 102 can provide for display the entire message. FIG. 7 depicts an example display configuration 224. For instance, user device 102 can provide for display message body 226 corresponding to the message preview 212 associated with the message received from Timo. In some implementations, the user can scroll or cycle through one or more additional received messages (e.g. the messages received from Ivan and/or Todd) such that the entirety of such additional messages are displayed on user interface 202.

Figure 8:
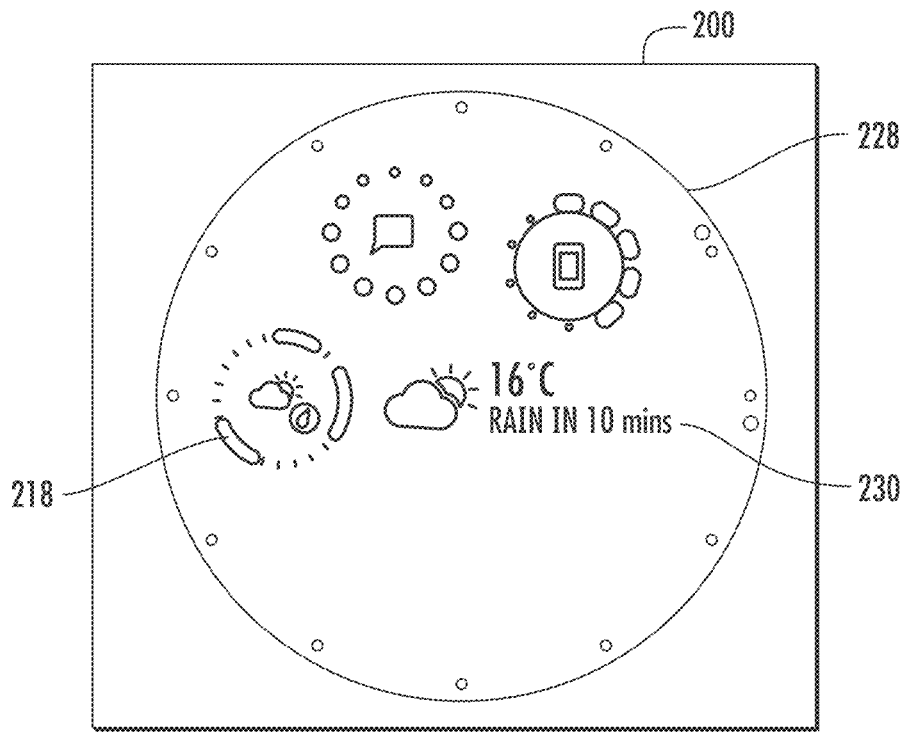

Referring back to FIG. 6, the user may also navigate through to application icons 218 and 220 (e.g. through performance of control gestures). For instance, FIG. 8 depicts display configuration 228. Display configuration 228 depicts application icon 218 subsequent to a performance of a control gesture by control article 104 to prompt a scroll through to application icon 218. As shown, application icon 218 corresponds to a weather application. Upon scrolling through to application icon 218, a preview 230 of the weather application can be displayed on user interface 200. The user can then select application icon 218 to prompt user device 102 to open the weather application to cause the weather application to run on user device 102. Opening of the weather application can trigger additional interactive data associated with the weather application to be displayed on user interface 200. The user can then interact with the weather application in a desired manner.

As indicated above, it will be appreciated that various other user interfaces can be used having various other display configurations without deviating from the scope of the present disclosure. For instance, various user interfaces associated with various user devices can be used, and can be controlled using various suitable control gestures. In addition, various other suitable presentation and/or interactive data associated with various other suitable applications can be displayed within the user interface.

Figure 9:
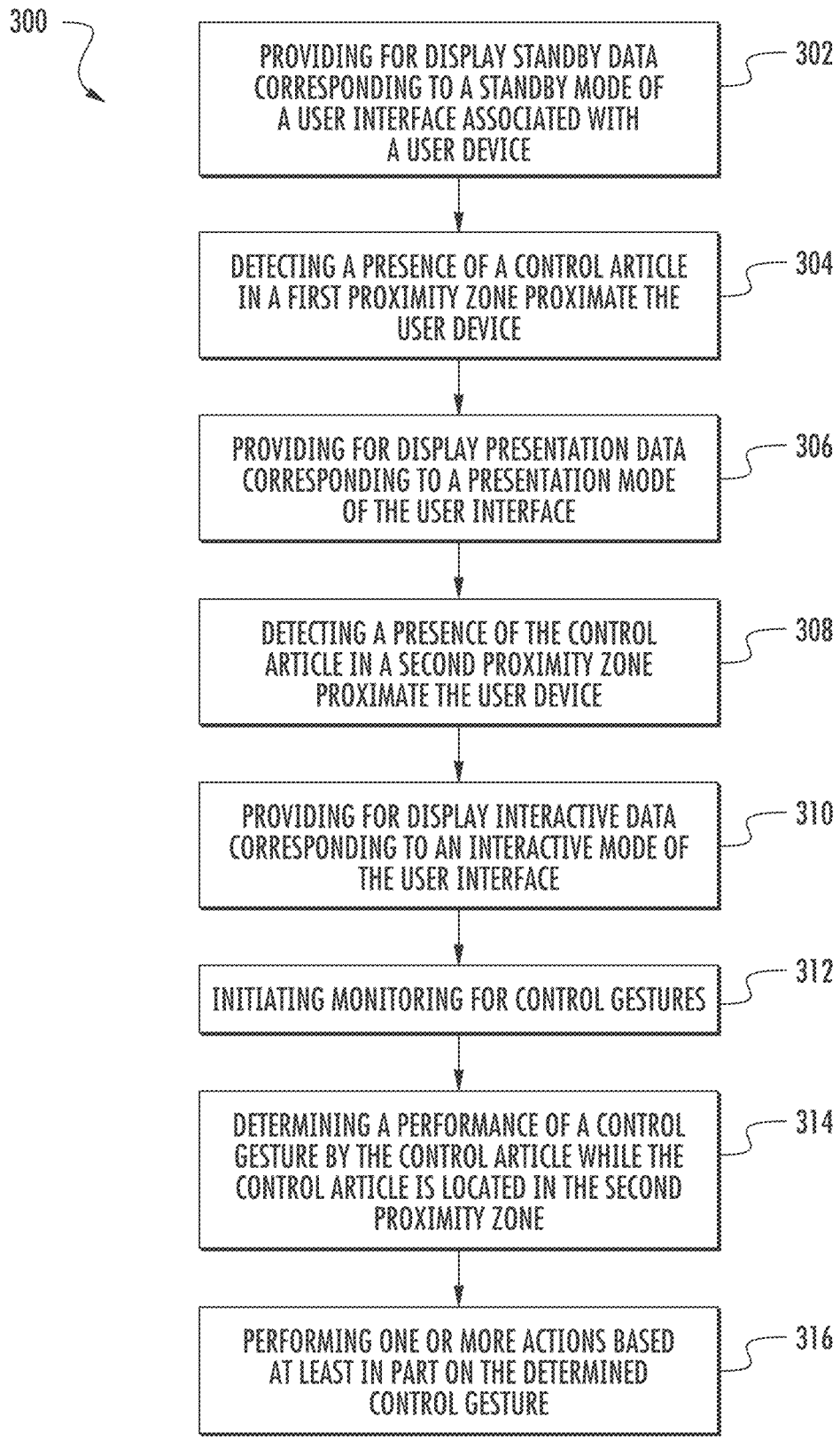
FIG. 9 depicts a flow diagram of an example method of providing gesture-based control of a user interface according to example embodiments of the present disclosure

FIG. 9 depicts a flow diagram of an example method (300) of providing gesture-based control of a user interface according to example embodiments of the present disclosure. Method (300) can be implemented by one or more computing devices, such as one or more of the computing devices depicted in FIG. 12. In addition, FIG. 9 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (302), method (300) can include providing for display standby data corresponding to a standby mode of a user interface associated with a user device. For instance, the standby data can include temporal data associated with a current time and/or data, or other data. In some implementations, the user device can operate in standby mode when the user device does not detect a control article. As indicated above, a control article can be an article or object configured to perform control gestures to control operation of the user device.

At (304), method (300) can include detecting a presence of the control article in a first proximity zone proximate the user device. The first proximity zone can be included within a proximity zone configuration having one or more proximity zones. The first proximity zone can be any suitable shape and/or size. In some implementations, the boundaries of the first proximity zone can be determined based at least in part on an antenna beam pattern associated with the user device.

At (306), method (300) can include providing for display presentation data corresponding to a presentation mode of the user interface. The user device can operate in the presentation mode while the control article is present in the first proximity zone. For instance, the presentation data can be displayed in response to detecting the presence of the control article in the first proximity zone. The presentation data can include data associated with a currently running application on the user device. The presentation data can be non-interactive data. In some implementations, the presentation data can be displayed for the duration of the time that the control article is present in the first proximity zone. In some implementations, the user device will not detect or respond to control gestures performed by the control article while operating in the presentation mode.

At (308), method (300) can include detecting a presence of the control article in a second proximity zone proximate the user device. The second proximity zone can be included within the proximity zone configuration. In some implementations the proximity zone configuration can be predetermined. The second proximity zone can separate the user device and the first proximity zone. For instance, the second proximity zone can be an area or region adjacent to the user device, and can extend outward from the user device in one or more directions. The first proximity zone can be adjacent to the second proximity zone and can extend outward from the first proximity zone in one or more directions. The first and second proximity zones can be separated by one or more boundaries or thresholds.

At (310), method (300) can include providing for display interactive data corresponding to an interactive mode of the user interface. The user device can operate in the interactive mode while the control article is located in the second proximity zone. For instance, the interactive data can be displayed in response to detecting the presence of the control article in the second proximity zone. For instance, the interactive data can include data associated with one or more applications installed on or otherwise associated with the user device. While operating in the interactive mode, the user device can be configured to interact with a user (e.g. via performed control gestures).

At (312), method (300) can include initiating monitoring for control gestures. For instance, the user device can track the control article and determine a motion profile associated with the control article. As indicated, determining the motion profile can include determining velocity data, location data (e.g. spatial coordinates, radial distance from user device, etc.), and/or other data during one or more time periods. The motion profile can be compared against a set of predetermined control gestures to determine a match (or a sufficient match) between a movement pattern of the control article and a control gesture from the predetermined set of control gestures.

At (314), method (300) can include determining a performance of a control gesture by the control article while the control article is located in the second proximity zone. At (316), method (300) can include performing one or more actions based at least in part on the determined control gesture. For instance, each control gesture of the set of control gestures can have a corresponding one or more actions that are to be performed by the user device in response to a detection of a performance of the control gesture by the control article. In some implementations, the one or more actions can correspond to user interface control actions, such as scrolling, selecting, zooming, etc. within the user interface. For instance, the user interface control actions can be contextual actions based at least in part on a current status of the user interface.

Figure 10:
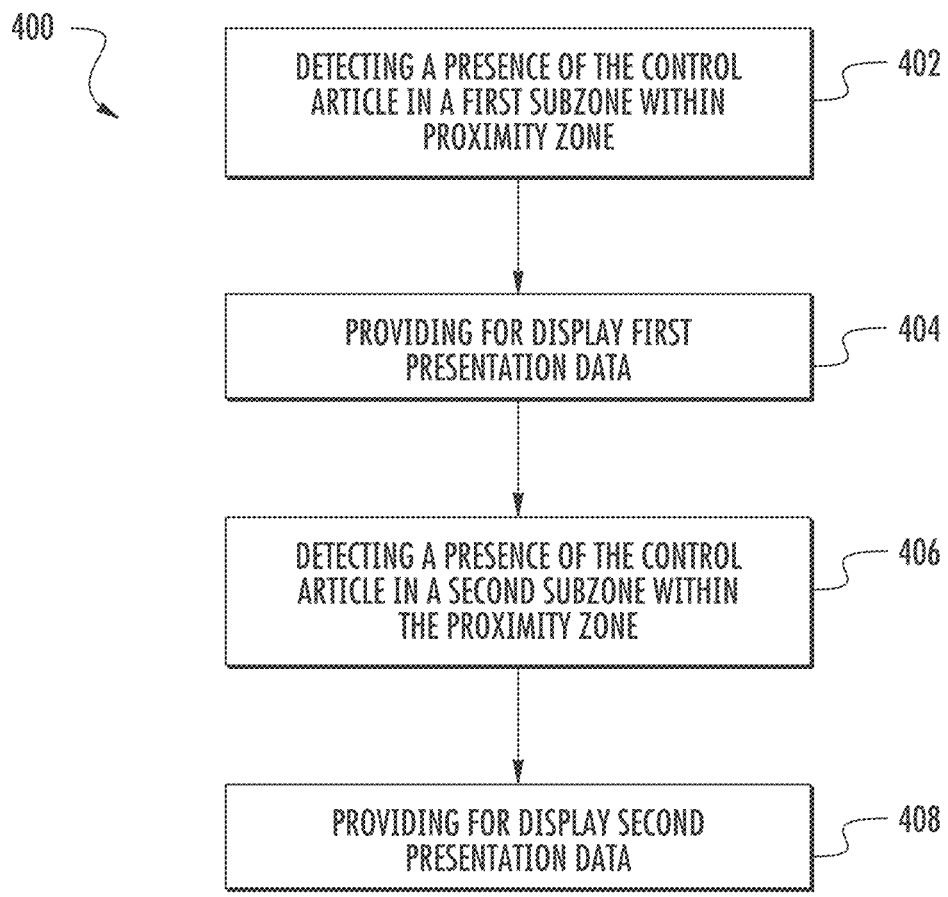
FIG. 10 depicts a flow diagram of an example method of providing for display presentation data according to example embodiments of the present disclosure.

As indicated above, in some implementations, the first and/or second proximity zones may include one or more subzones located within the first and/or second proximity zone. Detection of the control article within the subzones can trigger display of data by the user device. For instance, FIG. 10 depicts a flow diagram of an example method (400) of providing for display first and second presentation data according to example embodiments of the present disclosure. Method (400) can be implemented by one or more computing devices, such as one or more of the computing devices depicted in FIG. 12. In addition, FIG. 10 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (402), method (400) can include detecting a presence of the control article in a first subzone within a proximity zone. As indicated, the first subzone can be a region or area defining a portion of the proximity zone. In this manner, the first subzone can be located within the proximity zone. In some implementations, the first subzone can be a subzone that is farthest away from the user device within the proximity zone.

At (404), method (400) can include providing for display first presentation data. The first presentation data can be provided for display in response to a detection of the presence of the control article in the first subzone. As indicated above, the first presentation data can correspond to a presentation mode associated with the user interface associated with the user device. In some implementations, the first presentation data can include a first subset of the presentation data to be displayed in association with the presentation mode. For instance, the first presentation data can include data associated with an application currently running on the user device.

At (406), method (400) can include detecting a presence of the control article in a second subzone within the proximity zone. The second subzone can define a separate region or area within the proximity zone from the first subzone. In some implementations, the first and second subzones can be adjacent subzones. In some implementations, the second subzone can be closer to the user device than the first subzone.

At (408), method (400) can include providing for display second presentation data. The second presentation data can be provided for display in response to a detection of the presence of the control article in the second subzone. In some implementations, the second presentation data can include a second subset of the presentation data to be displayed in association with the presentation mode. For instance, the second presentation data can include additional or different data associated with the currently running application from the first presentation data. The second presentation data can be displayed in addition to the first presentation data or as a replacement to the first presentation data.

It some implementations, one or more additional subzones (e.g. third subzone, fourth subzone, etc.) can be used to trigger the display of addition presentation data (third presentation data, fourth presentation data, etc.). In some implementations, distance thresholds within the proximity zone can be used to trigger display of the various presentation data (e.g. first presentation data second presentation data, etc.). In such implementations, the proximity zones can correspond to an area or region between the distance thresholds.

Figure 11:
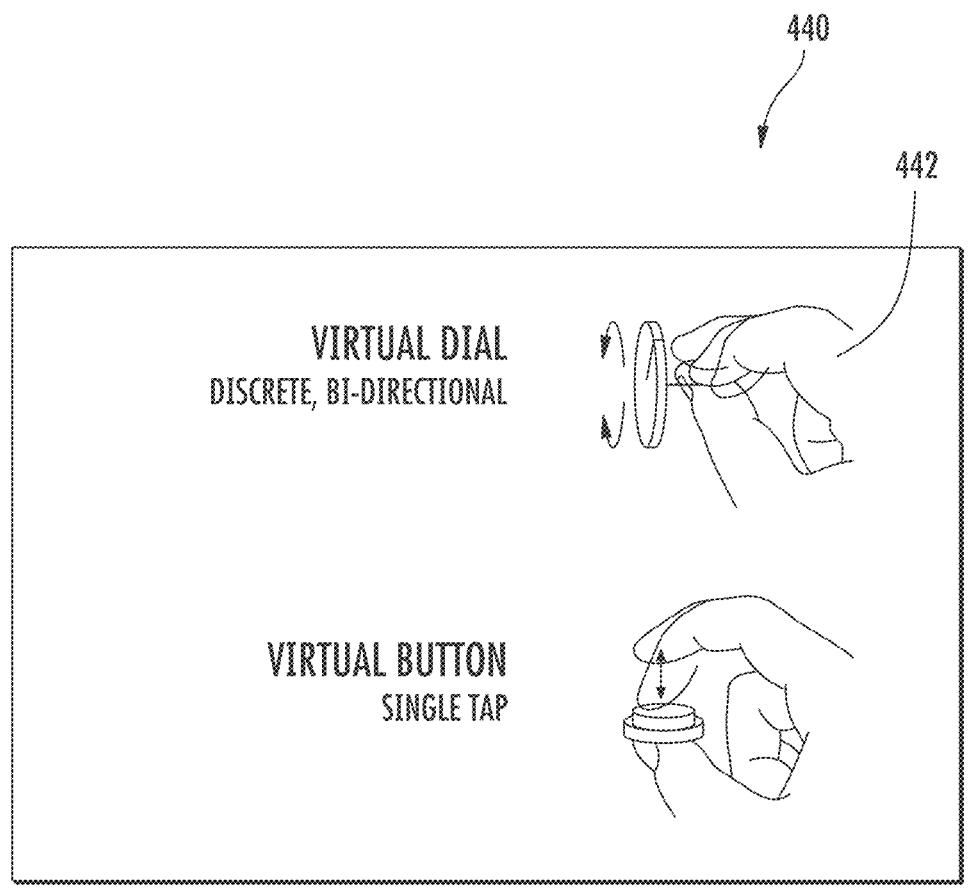
FIG. 11 depicts a flow diagram of an example control gesture set according to example embodiments of the present disclosure.

FIG. 11 depicts an example control gesture set 440 according to example embodiments of the present disclosure. As shown, the control gesture set 440 includes a plurality of control gestures that can be performed by a representative control article 442 (e.g. human hand). In particular, control gesture set 440 includes a virtual dial control gesture and a virtual button control gesture. In some implementations, the control gesture set can include one or more additional control gestures, such as a double virtual button control gesture, a shake control gesture, a long shake control gesture, and/or other suitable control gestures.

As shown, the control gestures in control gesture set 440 each include a motion component by the control article. For instance, the virtual dial control gesture can include a rotation of a thumb and finger of a human hand to mimic a turning of a dial or knob. As another example, the virtual button control gesture can include a movement of the thumb or a finger towards each other to mimic the pressing of a button. In this manner, a double virtual tap motion can include such motion twice in a row to mimic a double press of a button. As yet another example, a shake control gesture can include a motion of one or more fingers in a back and forth motion to mimic a shaking motion. In this manner, a long shake control gesture can include a longer back and forth motion of the one or more fingers to mimic a longer shaking motion.

As indicated above, when a user computing device (e.g. smartwatch) according to example embodiments of the present disclosure detects a performance of a control gesture included in control gesture set 440 by a suitable control article (e.g. a hand of a user proximate the user computing device), the user computing device can perform one or more actions. In particular, the control gestures in control gesture set 440 can be mapped to one or more actions to be performed in response to detection of a control gesture in control gesture set by a control article. Such actions can be contextual user interface control actions.

As an example, the virtual dial control gesture can be mapped to an action associated with a navigation through the user interface. The navigation can be dependent on a current context of the user interface. As an example, when the user interface is displaying display configuration 228 of FIG. 8, a detection of a performance of the virtual dial control gesture can cause the user device to cycle or scroll through complications (e.g. application icons 205, 218, 220) displayed on the user interface. As another example, when the user interface is displaying display configuration 224, a detection of a performance of the virtual dial control gesture can cause the user device to cycle or scroll through messages within the messaging application. The virtual dial control gesture can be a bidirectional control gesture. In this manner, a rotation of a thumb and finger in a first direction (e.g. clockwise) can cause a navigation (e.g. scroll) in a first direction, and a rotation of a thumb and finger in a second direction (e.g. counter-clockwise) can cause a navigation (e.g. scroll) in a second direction.

The virtual button control gesture can be mapped to a selection action associated with the user interface. For instance, a detection of a performance of the virtual button control gesture can cause the user device to open an application installed on the user device. As an example, when the user interface is displaying display configuration 216, a detection of a performance of the virtual button control gesture can cause the user device to open the messaging application associated with application icon 205. In this manner, a more detailed view of the messaging application can be displayed, such as the view displayed in display configuration 224. In some implementations, if the selected application (e.g. in response to a detection of a performance of the virtual button control gesture) is not running at the time of the selection, the virtual button control gesture can cause the selected application to run on the user device. For instance, when display configuration 228 is being displayed on the user interface, a detection of a performance of the virtual button control gesture can cause the weather application associated with application icon 218 to run on the user device. The virtual button control gesture can further cause the user interface to open a more detailed view of the weather application. As indicated, once the more detailed view of the weather application is displayed, the control gestures associated with control gesture set 440 can be used to control the user interface within the weather application.

Figure 12:
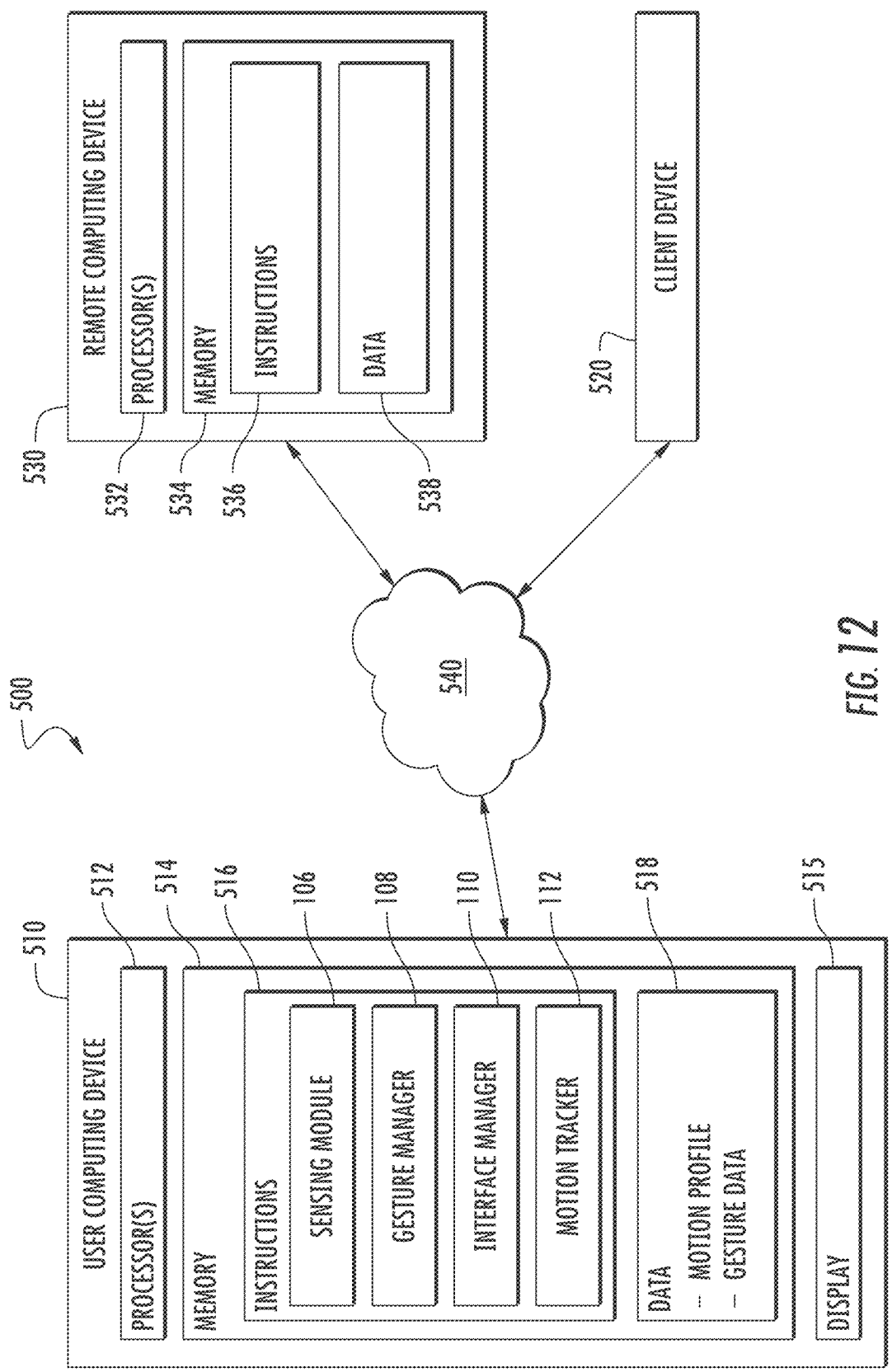
FIG. 12 depicts an example system according to example embodiments of the present disclosure.

FIG. 12 depicts an example computing system 500 that can be used to implement the methods and systems according to example aspects of the present disclosure. The system 500 can be implemented using a single computing device, or the system 500 can be implemented using a client-server architecture wherein a user computing device communicates with one or more remote computing devices 530 over a network 540. The system 500 can be implemented using other suitable architectures.

As indicated, the system 500 includes user computing device 510. The user computing device 510 can be any suitable type of computing device, such as a general purpose computer, special purpose computer, speaker device, laptop, desktop, mobile device, navigation system, smartphone, tablet, wearable computing device, a display with one or more processors, or other suitable computing device. The user computing device 510 can have one or more processors 512 and one or more memory devices 514. The user computing device 510 can also include a network interface used to communicate with one or more remote computing devices 530 over the network 540. The network interface can include any suitable components for interfacing with one more networks, including for example, transmitters, receivers, ports, controllers, antennas, or other suitable components.

The one or more processors 512 can include any suitable processing device, such as a microprocessor, microcontroller, integrated circuit, logic device, graphics processing unit (GPU) dedicated to efficiently rendering images or performing other specialized calculations, or other suitable processing device. The one or more memory devices 514 can include one or more computer-readable media, including, but not limited to, non-transitory computer-readable media, RAM, ROM, hard drives, flash drives, or other memory devices. The one or more memory devices 514 can store information accessible by the one or more processors 512, including computer-readable instructions 516 that can be executed by the one or more processors 512. The instructions 516 can be any set of instructions that when executed by the one or more processors 512, cause the one or more processors 512 to perform operations. For instance, the instructions 516 can be executed by the one or more processors 512 to implement, for instance, the sensing module 106, gesture manager 108, interface manager 110, and/or motion tracker 112 described with reference to FIG. 1.

As shown in FIG. 12, the one or more memory devices 514 can also store data 518 that can be retrieved, manipulated, created, or stored by the one or more processors 512. The data 518 can include, for instance, gesture data 114 motion profile data determined according to example embodiments of the present disclosure, and other data. The data 518 can be stored in one or more databases. In various implementations, the one or more databases can be implemented within user computing device 510, connected to the user computing device 510 by a high bandwidth LAN or WAN, and/or connected to user computing device 510 through network 540. The one or more databases can be split up so that they are located in multiple locales.

The user computing device 510 of FIG. 12 can include various input/output devices for providing and receiving information from a user, such as a touch screen, touch pad, data entry keys, speakers, and/or a microphone suitable for voice recognition. For instance, the user computing device 510 can have a display device 515 for presenting a user interface for displaying application data according to example aspects of the present disclosure.

The user computing device 510 can exchange data with one or more remote computing devices 530 over the network 540. In some implementations, a remote computing device 530 can be server, such as a web server. Although only two remote computing devices 530 are illustrated in FIG. 12, any number of remote computing devices 530 can be connected to the user computing device 510 over the network 540.

The remote computing device(s) 530 can be implemented using any suitable computing device(s). Similar to the user computing device 510, a remote computing device 530 can include one or more processor(s) 532 and a memory 534. The one or more processor(s) 532 can include one or more central processing units (CPUs), and/or other processing devices. The memory 534 can include one or more computer-readable media and can store information accessible by the one or more processors 532, including instructions 536 that can be executed by the one or more processors 532 and data 538.

The remote computing device 530 can also include a network interface used to communicate with one or more remote computing devices (e.g. user computing device 510) over the network 540. The network interface can include any suitable components for interfacing with one more networks, including for example, transmitters, receivers, ports, controllers, antennas, or other suitable components.

The network 540 can be any type of communications network, such as a local area network (e.g. intranet), wide area network (e.g. Internet), cellular network, or some combination thereof. The network 540 can also include a direct connection between a remote computing device 530 and the user computing device 510. In general, communication between the user computing device 510 and a remote computing device 530 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computing device comprising:
    a radar module configured to detect a presence of a control article in a first proximity zone and a second proximity zone proximate the computing device, the second proximity zone:
        defining a separate physical area than the first proximity zone;
        being adjacent to the first proximity zone; and
        separating the first proximity zone and the computing device;
    at least one processor; and
    at least one memory device storing computer-readable instructions that, when executed by the at least one processor causes the at least one processor to perform operations comprising:
        responsive to receiving a first indication that the control article is in the first proximity zone, causing the computing device to enter a presentation mode, the presentation mode configured to cause a user interface associated with the computing device to display one or more presentation user interface elements;
        responsive to receiving a second indication that the control article is in the second proximity zone, causing the computing device to enter an interactive mode, the interactive mode configured to cause the user interface associated with the computing device to display one or more interactive user interface elements and remove at least one of the presentation user interface elements; and
        removing at least one of the non-interactive user interface elements or at least one of the interactive user interface elements, the removing responsive to:
            a removal of the control article from the first proximity zone or the second proximity zone; or
            determining, based on at least one of a motion profile of the control article or a duration of time that the control article is detected in the first proximity zone or the second proximity zone, that a movement pattern indicates an unintentional interaction.

2. The computing device of claim 1, wherein the non-interactive user interface elements are determined based on a location of the control article within the first proximity zone.

3. The computing device of claim 1, wherein the user interface elements are determined based at least in part on a currently running application associated with the computing device.

4. The computing device of claim 1, wherein the operations further comprise, responsive to not detecting the presence of the control article in the first or second proximity zone, causing display of a standby mode of the user interface, the standby mode comprising one or more standby user interface elements without at least one of the non-interactive user interface elements and without at least one of the interactive user interface elements.

5. The computing device of claim 4, wherein at least one of the standby user interface elements is a clock face or time display.

6. The computing device of claim 1, wherein the operations further comprise, responsive to detecting the presence of the control article in the second proximity zone, monitoring, via the radar module, for a performance of a control gesture by the control article.

7. The computing device of claim 6, wherein the monitoring comprises:
    determining, via the radar module, movement patterns associated with the control article; and
    comparing the movement patterns to one or more predetermined control gestures.

8. The computing device of claim 7, wherein the operations further comprise:
    determining, via the radar module, a control gesture performed by the control article while the control article is located in the second proximity zone; and
    performing at least one action based at least in part on the determined control gesture.

9. The computing device of claim 8, wherein the at least one action comprises a control action associated with at least one of the interactive user interface elements.

10. The computing device of claim 9, wherein:
    the at least one interactive user interface element is one of a plurality of interactive user interface elements corresponding to respective applications; and
    the control action scrolls through the interactive user interface elements.

11. A computer-implemented method comprising:
    responsive to receiving a first indication that a control article is in a first proximity zone, causing a computing device to enter a presentation mode, the presentation mode configured to cause a user interface associated with the computing device to display one or more presentation user interface elements;
    responsive to receiving a second indication that the control article is in a second proximity zone, causing the computing device to enter an interactive mode, the interactive mode configured to cause the user interface associated with the computing device to display one or more interactive user interface elements and remove at least one of the presentation user interface elements; and
    removing at least one of the non-interactive user interface elements or at least one of the interactive user interface elements, the removing responsive to:
        a removal of the control article from the first proximity zone or the second proximity zone; or
        determining, based on at least one of a motion profile of the control article or a duration of time that the control article is detected in the first proximity zone or the second proximity zone, that a movement pattern indicates an unintentional interaction.

12. The computer-implemented method of claim 11, wherein the non-interactive user interface elements are determined based on a location of the control article within the first proximity zone.

13. The computer-implemented method of claim 11, wherein the user interface elements are determined based at least in part on a currently running application associated with the computing device.

14. The computer-implemented method of claim 11, further comprising, responsive to not detecting the presence of the control article in the first or second proximity zone, causing display, by the computing device, of a standby mode of the user interface, the standby mode comprising one or more standby user interface elements without at least one of the non-interactive user interface elements and without at least one of the interactive user interface elements.

15. The computer-implemented method of claim 14, wherein at least one of the standby user interface elements is a clock face or time display.

16. The computer-implemented method of claim 11, further comprising, responsive to detecting the presence of the control article in the second proximity zone, monitoring, via the radar module of the computing device, for a performance of a control gesture by the control article.

17. The computer-implemented method of claim 16, wherein the monitoring comprises:

determining, via the radar module of the computing device, movement patterns associated with the control article; and comparing, by the computing device, the movement patterns to one or more predetermined control gestures.

18. The computer-implemented method of claim 17, further comprising:

determining, via the radar module of the computing device, a control gesture performed by the control article while the control article is located in the second proximity zone; and performing, by the computing device, at least one action based at least in part on the determined control gesture.

19. The computer-implemented method of claim 18, wherein the at least one action comprises a control action associated with at least one of the interactive user interface elements.

20. The computer-implemented method of claim 19, wherein:

the at least one interactive user interface element is one of a plurality of interactive user interface elements corresponding to respective applications; and the control action scrolls through the interactive user interface elements.

\* \* \* \* \*